United States Patent
Wei et al.

(10) Patent No.: US 12,550,018 B2
(45) Date of Patent: Feb. 10, 2026

(54) COMMUNICATIONS DEVICE, COMMUNICATIONS NODES IN A WIRELESS COMMUNICAITONS NETWORK AND METHODS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 365 days.

(21) Appl. No.: 18/011,197

(22) PCT Filed: Jul. 1, 2021

(86) PCT No.: PCT/EP2021/068278
§ 371 (c)(1),
(2) Date: Dec. 19, 2022

(87) PCT Pub. No.: WO2022/012962
PCT Pub. Date: Jan. 20, 2022

(65) Prior Publication Data
US 2023/0239763 A1    Jul. 27, 2023

(30) Foreign Application Priority Data
Jul. 17, 2020 (EP) ..................... 20186605

(51) Int. Cl.
*H04W 36/00* (2009.01)
*H04W 36/32* (2009.01)

(52) U.S. Cl.
CPC . *H04W 36/00837* (2018.08); *H04W 36/0058* (2018.08); *H04W 36/322* (2023.05); *H04W 36/0064* (2023.05)

(58) Field of Classification Search
CPC ....... H04W 36/00837; H04W 36/0058; H04W 36/322; H04W 36/326; H04W 36/362;
(Continued)

(56) References Cited

U.S. PATENT DOCUMENTS

| | | | |
|---|---|---|---|
| 2011/0206012 A1* | 8/2011 | Youn | H04W 36/00698 370/332 |
| 2019/0289505 A1* | 9/2019 | Thomas | H04W 36/0016 |

(Continued)

FOREIGN PATENT DOCUMENTS

WO    2019/141687 A1    7/2019

OTHER PUBLICATIONS

International Search Report and Written Opinion mailed on Oct. 22, 2021, received for PCT Application PCT/EP2021/068278, filed on Jul. 1, 2021, 17 pages.

(Continued)

*Primary Examiner* — Mohamed A Kamara
(74) *Attorney, Agent, or Firm* — XSENSUS LLP

(57) ABSTRACT

A method of operating a source node of a wireless network for controlling handover of a device from the source node to a target node of the wireless network is provided. The method comprises selecting, by the source node, to handover the device from the source node to the target node at a future time on a basis of a predicted location of the device at the future time; transmitting, by the source node, a pre-configuration message to the device including a configuration for the handover of the device from the source node to the target node at the future time; and arranging, by the source node, for the device to receive a trigger instructing the device to handover from the source node to the target node at the future time.

18 Claims, 14 Drawing Sheets

(58) Field of Classification Search
CPC ......... H04W 36/0064; H04W 36/0009; H04W 36/24; H04W 36/38; H04W 36/245
See application file for complete search history.

(56) References Cited

U.S. PATENT DOCUMENTS

| | | | |
|---|---|---|---|
| 2020/0252838 A1* | 8/2020 | Akdeniz | H04W 36/0061 |
| 2021/0084558 A1* | 3/2021 | Speicher | H04W 36/22 |
| 2021/0378027 A1* | 12/2021 | Wang | H04W 74/0836 |
| 2022/0167216 A1* | 5/2022 | Kolekar | H04W 36/08 |

OTHER PUBLICATIONS

Qualcomm Inc., "New WID on NR-based Access to Unlicensed Spectrum", 3GPP TSG RAN Meeting #82, RP-182878, Dec. 10-13, 2018, 7 pages.

Zte Corporation et al., "New work item: 2-step RACH for NR", 3GPP TSG RAN Meeting #82, RP-182894, Dec. 10-13, 2018, 5 pages.

3GPP, "Study on further enhancements to LTE Device to Device (D2D), User Equipment (UE) to network relays for Internet of Things (IoT) and wearables; (Release 15)", 3GPP TR 36.746 V1.1.0, Aug. 2017, pp. 1-56.

3GPP, "Solutions for NR to support non-terrestrial networks (NTN) (Release 16)", 3GPP TR 38.821 V16.0.0, Dec. 2019, pp. 1-140.

3GPP, "NR; Medium Access Control (MAC) protocol specification (Release 15)", 3GPP TS 38.321 V15.3.0, Sep. 2018, pp. 1-76.

CMCC, "Considerations on mobility for Geo", 3GPP TSG-RAN WG2 Meeting #107, R2-1909439, Aug. 26-30, 2019, 3 pages.

Holma et al., "LTE for UMTS OFDMA and SC-FDMA Based Radio Access", John Wiley & Sons, 2009, 232 pages.

Interdigital Inc., "Conditional Mobility for Non-Terrestrial Networks", 3GPP RAN WG2 Meeting #106, R2-1907840, May 13-17, 2019, 5 pages.

Nec, "Location based mobility enhancement", 3GPP TSG-RAN WG2 #108, R2-1914973, Nov. 18-22, 2019, 4 pages.

Nokia et al., "Discussion on feeder link switch for regenerative & transparent NTN LEO scenarios", 3GPP TSG-RAN WG2 Meeting #106, R2-1910698, Aug. 26-30, 2019, 12 pages.

Nokia et al., "Revised SID: Study on NR Industrial Internet of Things (IoT)", 3GPP TSG RAN meeting #81, RP-182090, Sep. 10-13, 2018, 5 pages.

Sony: "Consideration on mobility impacts of NTN support in NR", 3GPP TSG RAN WG2 Meeting #105, R2-1901426, Feb. 25-Mar. 1, 2019, 2 pages.

* cited by examiner

COMMUNICATIONS DEVICE, COMMUNICATIONS NODES IN A WIRELESS COMMUNICAITONS NETWORK AND METHODS

CROSS-REFERENCE TO RELATED APPLICATIONS

The present application is based on PCT filing PCT/EP2021/068278, filed Jul. 1, 2021, which claims priority to European Patent Application No. 20186605.0, filed Jul. 17, 2020, the entire contents of each are incorporated herein by reference.

BACKGROUND

Field

The present disclosure relates to a method of operating a source communications node of a wireless communications network for controlling handover of a communications device from the source communications node to a target communications node of the wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

In addition, aspects of NR are concerned with mobility enhancements and in particular with increasing mobility robustness for new services which require low latency and high reliability performance (such as URLLC). Conventional handovers however are configured and executed using Layer 3 Radio Resource Control (RRC) layer signalling. Accordingly, latency in conventional handover procedures, and in particular group handover procedures, may be high.

Reducing signalling overhead and accelerating the execution of handover procedures therefore represents a technical problem.

SUMMARY

The present disclosure can help address or mitigate at least some of the issues discussed above.

Example embodiments of the present technique can provide a method of operating a source communications node of a wireless communications network for controlling handover of a communications device from the source communications node to a target communications node of the wireless communications network. The method comprises selecting, by control circuitry in the source communications node, to handover the communications device from the source communications node to the target communications node at a future time on a basis of a predicted location of the communications device at the future time; transmitting, by transmitter circuitry in combination with the control circuitry in the source communications node, a pre-configuration message to the communications device including a configuration for the handover of the communications device from the source communications node to the target communications node at the future time; and arranging, by the transmitter circuitry in combination with the control circuitry in the source communications node, for the communications device to receive a trigger instructing the communications device to handover from the source communications node to the target communications node at the future time.

According to other example embodiments of the present technique, there is provided a method of operating a source communications node of a wireless communications network to control handover of one or more communications devices. The method comprises transmitting, by the source communications node, a handover pre-configuration message to the one or more communications device providing a configuration for a handover of the one or more communications device from the source communications node to another communications node to form a target communications node when available. The method further comprises determining that the target communications node is available to act to receive signals from or to transmit signals to the one or more communications devices via a wireless access interface and to form part of a radio network of the wireless communications network, and to transmit by the source communications node, to the one or more communications devices a trigger instructing the one or more communications devices to handover from the source communications node to the target communications node.

In one example, a target communications node may be deployed to provide extra capacity so that the handover pre-configuration prepares one of more communications devices to handover to the target communications node when this is deployed, perhaps for example to relieve congestion.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
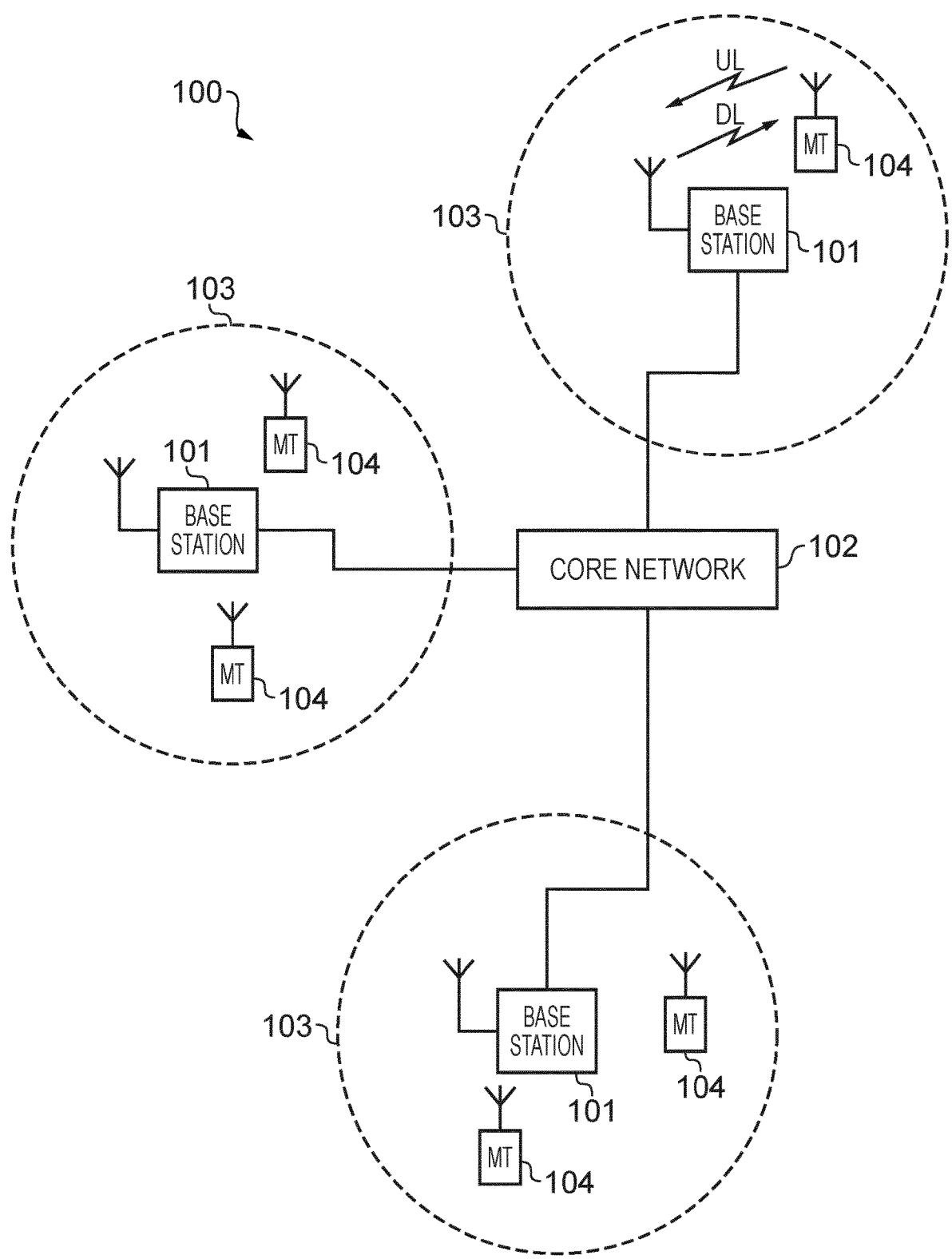
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
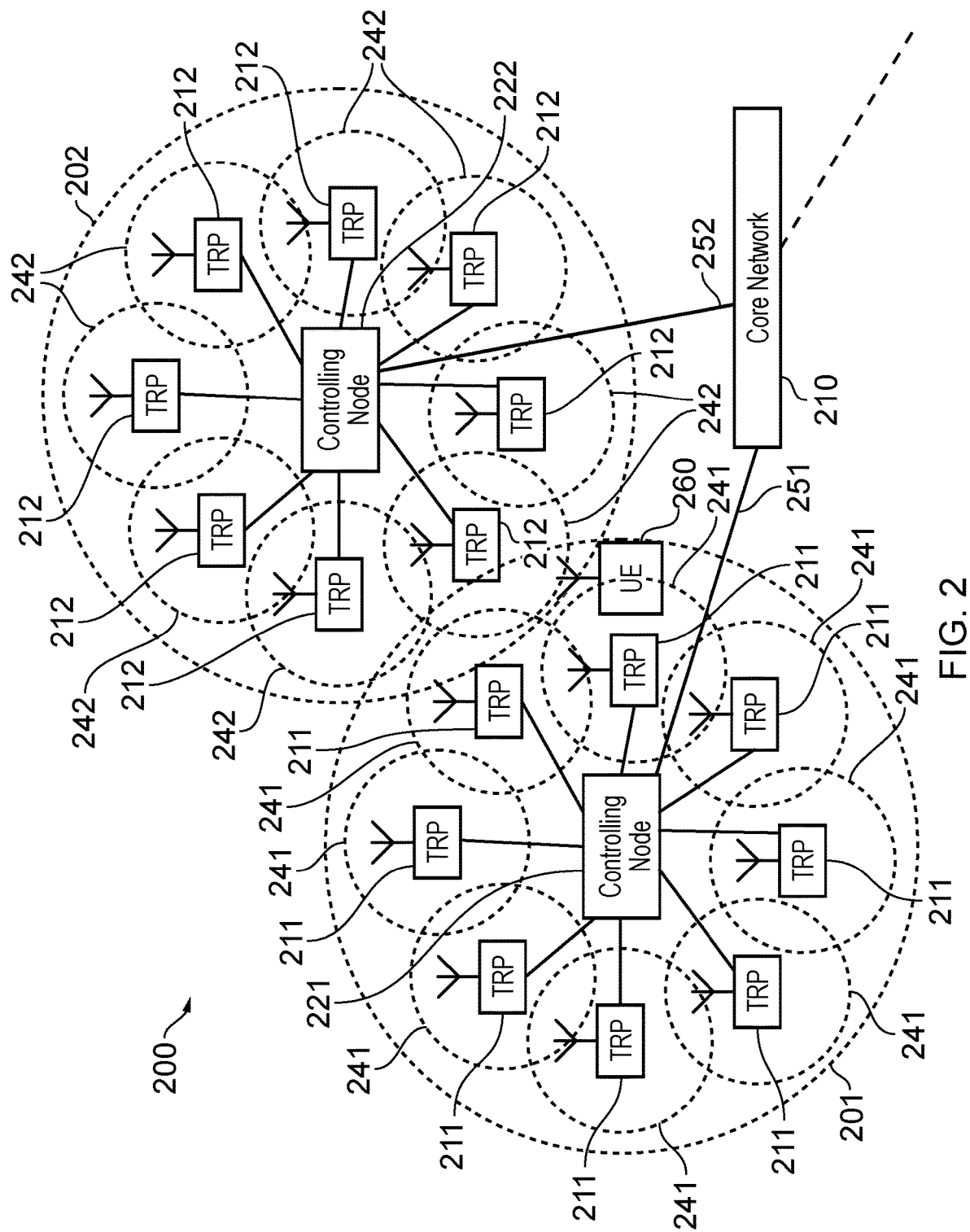
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Example embodiments of the present technique can a provide a method of operating a source communications node of a wireless communications network for controlling handover of a communications device from the source communications node to a target communications node of the wireless communications network. The method comprises selecting, by control circuitry in the source communications node, to handover the communications device from the source communications node to the target communications node at a future time on a basis of a predicted location of the communications device at the future time; transmitting, by transmitter circuitry in combination with the control circuitry in the source communications node, a pre-configuration message to the communications device including a configuration for the handover of the communications device from the source communications node to the target communications node at the future time; and arranging, by the transmitter circuitry in combination with the control circuitry in the source communications node, for the communications device to receive a trigger instructing the communications device to handover from the source communications node to the target communications node at the future time.

Figure 3:
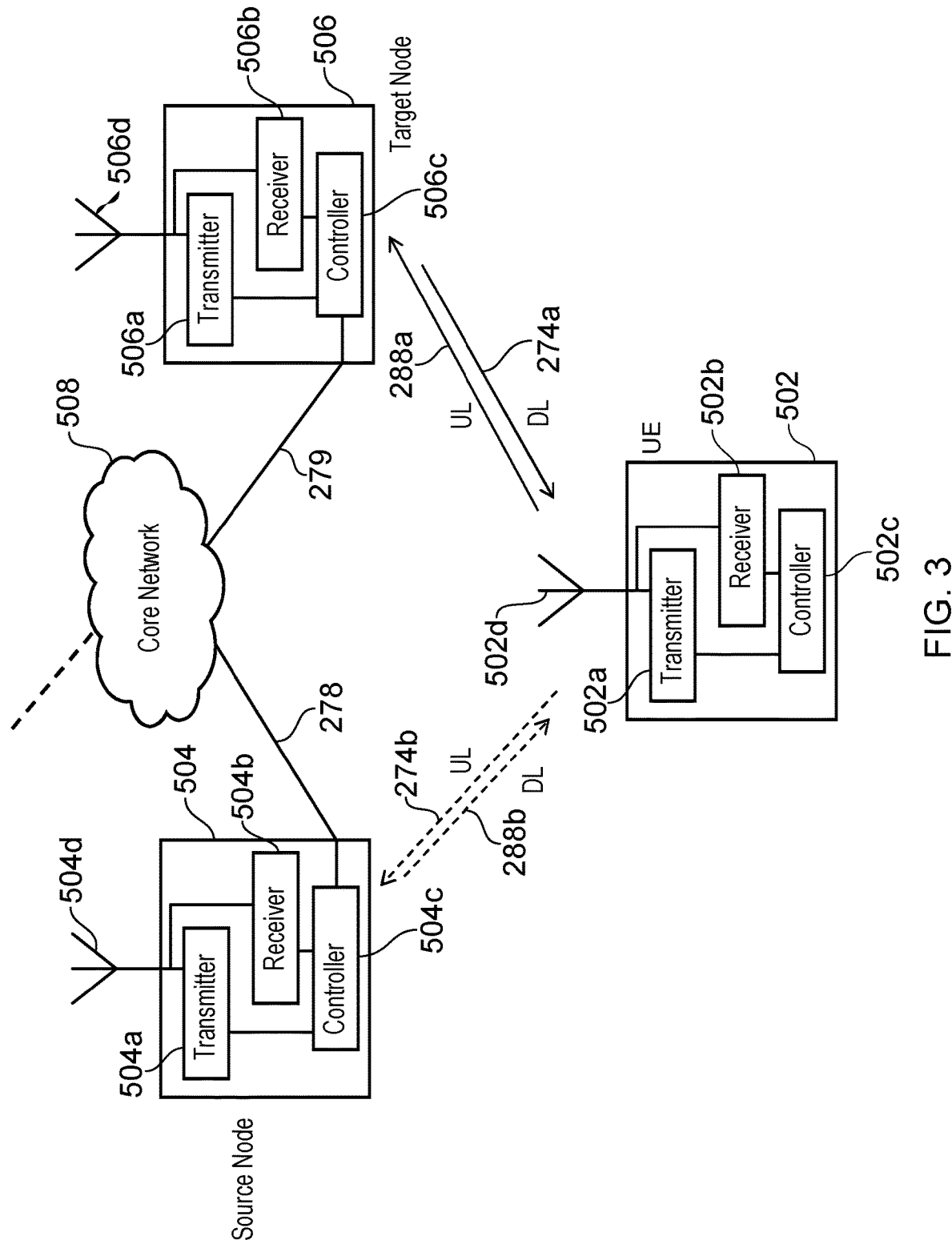
FIG. 3 is a schematic block diagram of an example of a source node or infrastructure equipment controlling handover of a communications device to a target infrastructure equipment in accordance with example embodiments.

A detailed illustration of a wireless communications network in which a handover may be performed is shown in FIG. 3. As will be appreciated from FIG. 3, a UE 502 is handed over from a source infrastructure equipment 504 to a target infrastructure equipment 506 forming part of a radio access network to a core network 508. In this example, the source infrastructure equipment 504 and the target infrastructure equipment 506 are a source communications node and a target communications node respectively. As will be appreciated the UE 502 is an example of a communications device such as the communications device 260 of FIG. 2.

Before the handover, the UE 502 transmits signals on an uplink UL and receive signals on a downlink DL from a source infrastructure equipment 504. The source infrastructure equipment 504 and the target infrastructure equipment 506 which may each be thought of as a gNB 101 or a combination of a controlling node 221 and TRP 211. Before the handover, the UE 502 is shown to transmit uplink data to the source infrastructure equipment 504 via uplink resources UL of a wireless access interface as illustrated generally by dashed arrow 274b to the source infrastructure equipment 504. The UE 502 may similarly be configured to receive downlink data transmitted by the source infrastructure equipment 504 via downlink resources DL as indicated by dashed arrow 288b from the source infrastructure equipment 504 to the UE. After the handover, the UE 502 is shown to transmit uplink data to the target infrastructure equipment 506 via uplink resources UL of a wireless access interface as illustrated generally by solid arrow 288a to the target infrastructure equipment 506. The UE 502 may similarly be configured to receive downlink data transmitted by the target infrastructure equipment 506 via downlink resources DL as indicated by solid arrow 274a from the target infrastructure equipment 506 to the UE 502.

As with FIGS. 1 and 2, the source and target infrastructure equipment 504, 506 are each connected to a core network 508 via interfaces 278, 279 to a controller 504c, 506c of the respective infrastructure equipment 504. The source and target infrastructure equipment 504, 506 each include a receiver 504b, 506b connected to an antenna 504d, 506d and a transmitter 504a, 506a connected to the antenna 504d, 506d. Correspondingly, the UE 502 includes a controller 502c connected to a receiver 502b which receives signals from an antenna 502d and a transmitter 502a also connected to the antenna 502d.

The controllers 504c, 504d are configured to control the source and target infrastructure equipment 504, 506 respectively and may comprise processor circuitry which may in turn comprise various sub-units/sub-circuits for providing functionality as explained further herein. These sub-units may be implemented as discrete hardware elements or as appropriately configured functions of the processor circuitry. Thus the controllers 504c, 506c may comprise circuitry which is suitably configured/programmed to provide the desired functionality using conventional programming/configuration techniques for equipment in wireless telecommunications systems. The transmitters 504a, 506a and the receivers 504b, 506b may comprise signal processing and radio frequency filters, amplifiers and circuitry in accordance with conventional arrangements. The transmitters 504a, 506a the receivers 504b, 506b and the controllers 504c, 506c are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 504 will in general comprise various other elements associated with its operating functionality.

Correspondingly, the controller 502c of the UE 502 is configured to control the transmitter 502a and the receiver 502b and may comprise processor circuitry which may in turn comprise various sub-units/sub-circuits for providing functionality as explained further herein. These sub-units may be implemented as discrete hardware elements or as appropriately configured functions of the processor circuitry. Thus the controller 502c may comprise circuitry which is suitably configured/programmed to provide the desired functionality using conventional programming/configuration techniques for equipment in wireless telecommunications systems. Likewise, the transmitter 502a and the receiver 502b may comprise signal processing and radio frequency filters, amplifiers and circuitry in accordance with conventional arrangements. The transmitters 502a, receivers 502b, and controllers 502c are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 502 will in general comprise various other elements associated with its operating functionality, for example a power source, user interface, and so forth, but these are not shown in FIG. 3 in the interests of simplicity.

The controllers 504c, 502c may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

RACH/Downlink Control Information (DCI)

As those acquainted with wireless communications system will appreciate, it is known for communications device to access a wireless communications network for various reasons such as requesting resources or to activate a handover using a random access procedure. The random access procedure involves the communications device transmitting a preamble on a physical random access channel and so the procedure is commonly referred to as a RACH or PRACH procedure/process. The RACH procedure/process can be a two-step RACH or a four-step RACH as explained in our co-pending European Patent Application EP20152077.2 the contents of which are incorporated herein by reference. According to the RACH process, when resources are granted for uplink or downlink or handover, downlink messages (i.e. messages transmitted by the base station 102), such as the Message B or the Message 2, may be preceded by a transmission of downlink control information (DCI) as a resource allocation message to indicate downlink communications resources on which the downlink message is to be transmitted.

A communications device which has recently transmitted either a Message A or a random access request may therefore monitor a downlink control channel on which the DCI may be transmitted. The communications device may determine that the DCI allocates resources for a message transmitted as part of the RACH procedure based on a temporary identity used to encode the DCI. For example, the DCI may be encoded using a random access radio network temporary identity (RA-RNTI), specifically pre-allocated for the purpose of encoding a DCI which allocates resources for a random access response (RAR) message.

In contrast for the transmission of uplink data, a communications device may transmit a RACH preamble in a PRACH channel and then transmit uplink information (control of data) in resources of a shared uplink channel (PUSCH) which is associated with the PRACH channel.

Conventional Handover

Aspects of NR are concerned with mobility enhancements and in particular with increasing mobility robustness for new services which require low latency and high reliability performance (such as URLLC). Situations may arise where a cell currently serving a UE may no longer be suitable or a radio link between the UE and a source gNB providing coverage in the cell is degraded. In such situations, it is generally desirable for the UE to switch to being served by a cell of a target gNB. The switching of UE from receiving service from the source gNB to receiving service from the target gNB is referred to as a handover as will be appreciated by one skilled in the art. Currently, the UE may be instructed to handover to the target UE by the source gNB as shown in FIG. 4 Alternatively, the UE may receive handover conditions from the source gNB and the UE performs the handover if the conditions are met.

Figure 4:
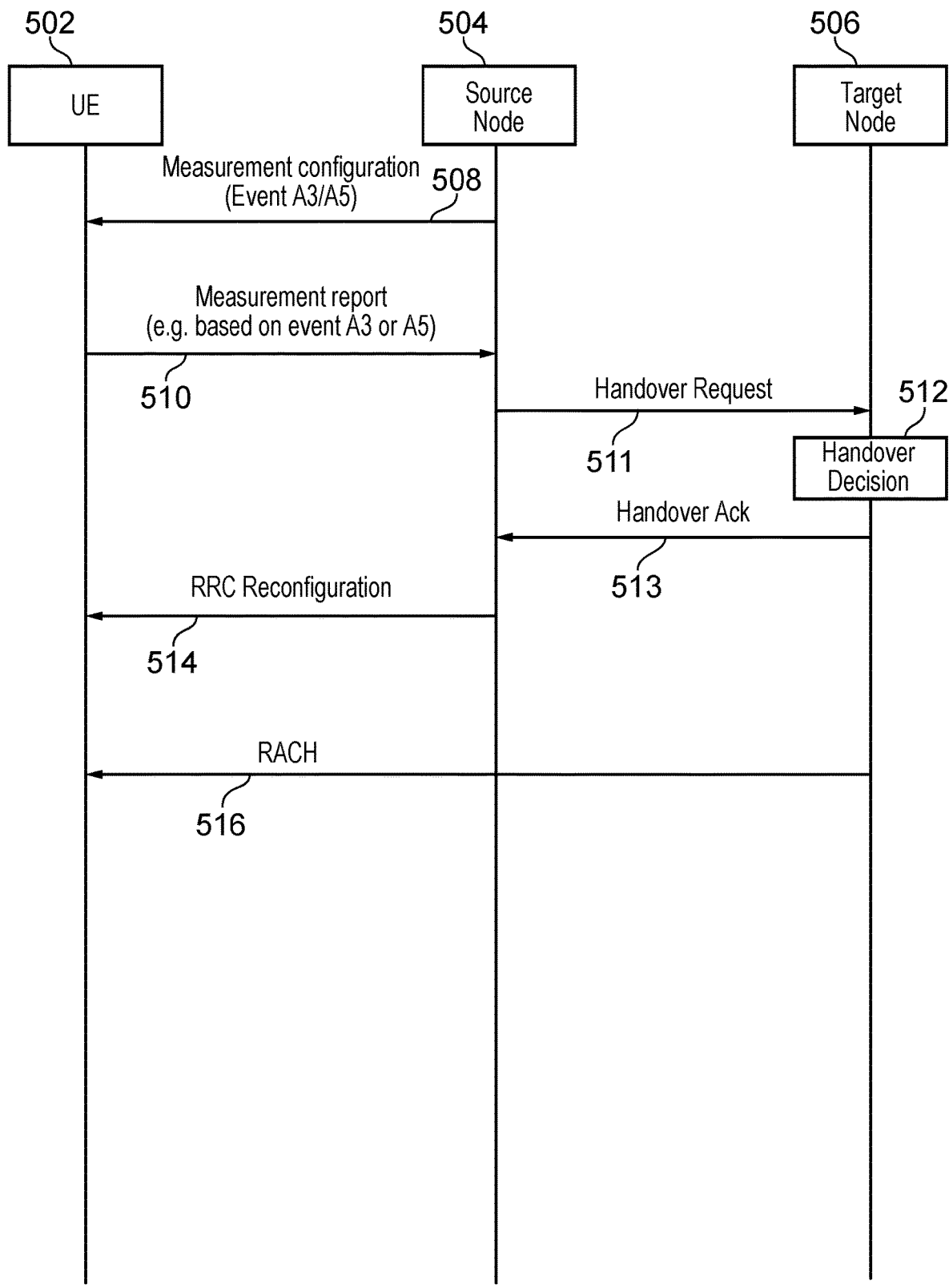
FIG. 4 illustrates an example of communications for a conventional handover of a UE from a source node to a target node.

FIG. 4 illustrates an example of conventional handover in which a source node instructs a UE to handover to a target node. The UE 502 is an example of a communications device. The source node 504 may be infrastructure equipment providing service to the UE 502. In some examples, the source node may be formed of a TRP, DU and CU. In other examples the source node 504 may be a gNB or eNB or any other infrastructure equipment described herein. In some examples, the source node 504 may be a relay UE. The target node 506 may similarly be any infrastructure equipment described herein or a relay UE. In step 508, a measurement configuration including one or more events is transmitted to the UE 502. The one or more events outline conditions to be met in order to trigger transmission of a measurement report from the UE 502 to the source communications node 504. Typically, in a conventional handover, events A3 and A5 (explained below) are included in the measurement configuration. Both events A3 and A5 involve a comparison between signal quality in a cell served by the source node and a cell served by the target node. If the UE 502 determines that the conditions outlined in events A3 and/or A5 are met, then it transmits a measurement report to the source node 504 in step 510. The measurement may include measurements made by the UE on one or more objects specified by the source node. The source node 504 then transmits a handover request 511 to the target node 506. The target node then determines radio resources to reserve for the UE 502 (for example, RACH resources). The target node 506 then transmits a handover request acknowledgement 513 to the source node 504 including an indication of the radio resources reserved for the UE.

The source node may then determine (on a basis of the received measurements) that the UE should handover from the source node to the target node. In this case, the source node sends an RRC reconfiguration message including a command to perform the handover to the UE. Alternatively, a conditional handover may be configured. In other words, the source node may configure one or more conditions to be met to perform a conditional handover to the target node 506 and include the one or more conditions in the RRC reconfiguration message 514 to be transmitted to the UE. The UE 502 then determines, on a basis of the one or more conditions included in the RRC reconfiguration message, whether the conditions have been met. If the conditions have been met, the UE performs handover.

Therefore, in step 514, the source node 504 transmits an RRC reconfiguration message to the UE 502 including either a command to perform the handover or, in the case of a conditional handover, the one or more conditions to be met to perform the handover. In an example, the one or more conditions which may be included in the RRC reconfiguration message may include a minimum link quality threshold between the UE 502 and the source node 504. If the UE determines that the link quality threshold is below the minimum threshold then the UE 502 determines that the conditions outlined in the RRC reconfiguration message have been met. If the UE 502 determines that one or more conditions included in the RRC reconfiguration message have been met or if the RRC reconfiguration message included the command to perform handover, then, in step 516, the UE 502 establishes radio communications link with the target node 506 through a random access channel (RACH) procedure. This may be a two-step RACH or four-step RACH. In this example, the triggering of the transmission of the measurement report in step 510 (and consequently the transmission of the one or more conditions/command for the handover in step 514) rely on the conditions outlined in events A3 and/or A5 being met.

TS 36.331 outlines that the UE will only transmit the measurement report in a case where conditions outlined in event A3 and/or event A5 are met, which concern moving from a source node, referred to as a primary cell (PCell) or primary/secondary cell (PSCell), to a target node:

Event A3: Neighbour becomes an amount of offset better than PCell/PSCell. In other words, a signal quality of a primary/secondary component carrier for a neighbouring cell becomes amount of offset better than a primary/secondary component carrier for a currently serving cell.

Event A4: Neighbour cell becomes better than an absolute threshold. That is to say an absolute value of received signal strength is defined and communicated to the UE. If the measured received signal strength of the synchronisation signal received from a gNB forming this neighbouring cell exceeds this absolute threshold and regardless of the received signal strength from the source gNB providing the PCell/PSCell, then the UE reports the measurement from the neighbouring cell.

Event A5: PCell/PSCell becomes worse than absolute threshold1 AND Neighbour becomes better than another absolute threshold2. In other words, a signal quality of a primary/secondary component carrier for a currently serving cell becomes worse than a first absolute threshold AND a signal quality primary/secondary component carrier for a neighbouring cell becomes better than a second absolute threshold.

For example, the condition in event A3 is met if the UE performing the measurements determines that values obtained from measurements of one or more component carriers of a neighbouring cell are a pre-determined amount better than one or more component carriers of a serving cell UE. For example, the measurements of the one or more component carriers may include one or more of a reference signal strength indicator (RSSI), reference signal received power (RSRP) and/or a reference signal received quality (RSRQ). The condition outlined in event A3 is regarded as being met in this case if one or more of the RSSI, RSRP or RSRQ of one or more component carriers of the neighbouring cell are a pre-determined amount higher than one or more component carriers of the serving cell.

For example, the condition in event A5 is met if the UE performing the measurements determines that values obtained from measurements of one or more component carriers of a serving cell of the UE is worse than a first threshold and the values obtained from measurements of a one or more component carriers of a neighbouring cell are better than a second threshold.

Therefore conventional handover procedures rely on a communications device measuring a quality of a radio link between the communications device and transmitting a measurement report to the source communications node when one or more pre-defined conditions are met (A3, A4, A5) using Radio Resource Control (RRC) layer signalling. The source node then either transmits a signal to the communications node instructing the handover or, in conditional handover, transmits handover conditions to the communications device and the communications device will handover to the target communications node if the handover conditions are met. Accordingly, signalling overhead in conventional handover procedures may be high.

Group Handover

Conventional handover procedures may also be applied to a group of UEs to be handed over from a source node to a target node in a "group handover". A group handover occurs when a plurality of communications devices are handed over from a source node to a target node. Examples of wireless communications networks configured to support group handover, Non-Terrestrial Networks (NTN) and Further Enhancement to device to device (FeD2D) networks. FeD2D networks were discussed in 4G LTE standards whereas NTN are being integrated into 5G standardisation. In networks such as NTN or FeD2D, the number of communications devices to be handed over in a group handover may be large. Using conventional handover procedures for such networks may therefore result in a very high signalling overhead as will be explained in more detail below.

Figure 5:
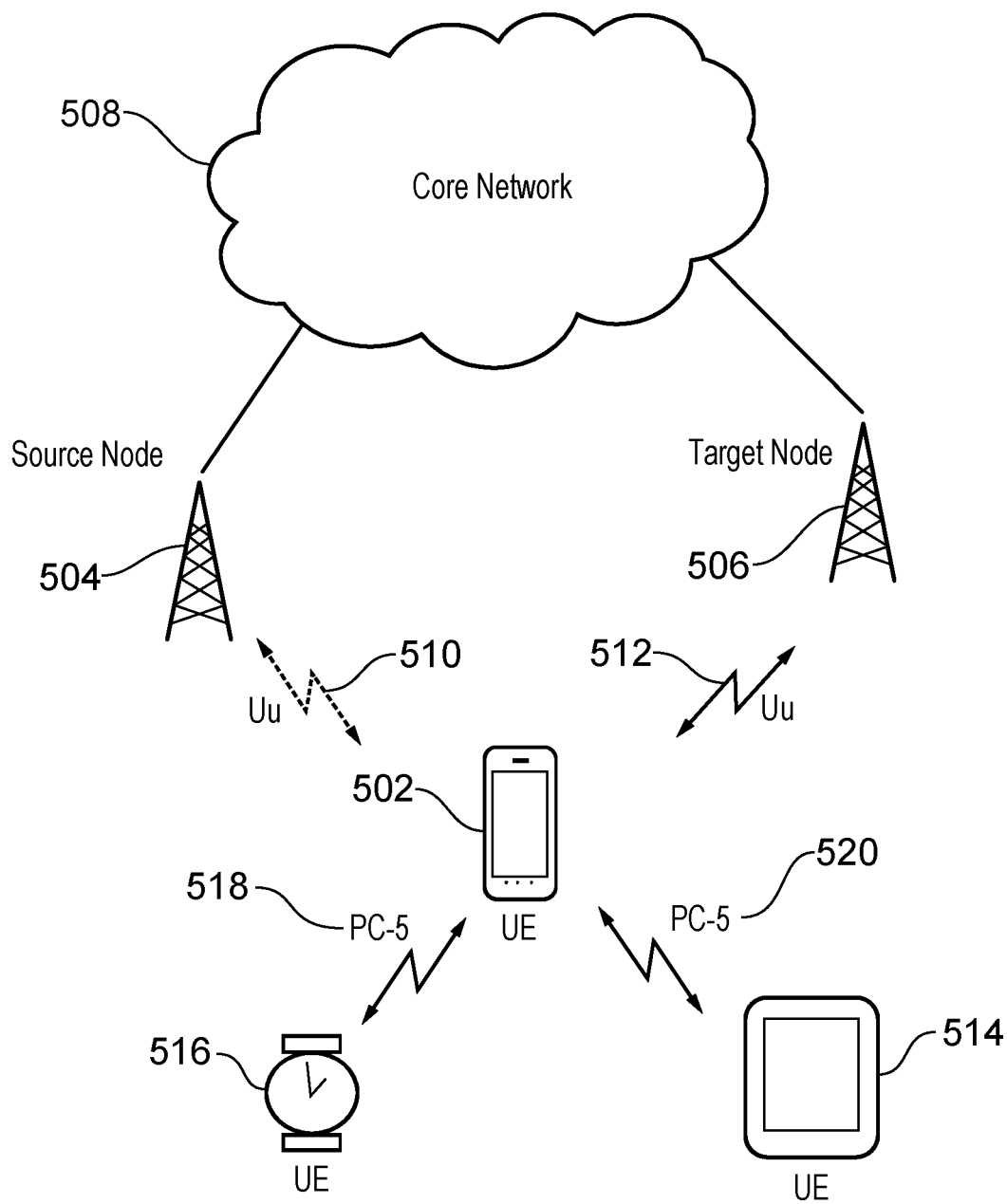
FIG. 5 is a schematic diagram illustrating an FeD2D wireless communications network which may be involved in a group handover procedure.

FIG. 5 illustrates an FeD2D wireless communications network which may be involved in a group handover procedure. As shown in FIG. 5, a relay UE 502 currently receiving service from a core network 508 via a source node 504 using a first Uu interface 510 is handed over to a target node 506. The relay UE 502 is connected to a first remote UE 516 and a second remote UE 514 via a first 518 and second 520 sidelink (PC-5) interface respectively. After the group handover, the relay UE 502 receives service from the target node 506 via the core network 508 using a second Uu interface 512. In the group handover shown in FIG. 5, the first remote UE 516 and the second remote UE 514 remain connected to the relay UE 502 via the first 518 and second 520 sidelink interfaces respectively after the handover of the relay UE 502 to the target communications node. Therefore contexts of the first remote UE 516 and the second remote UE 514 may remain collocated in the core network. In some examples the first and second UE are evolved Proximity-based Service (ProSe) devices. ProSe (Proximity Services) is a D2D (Device-to-Device) technology that allows LTE devices to detect each other and to communicate directly.

Figure 6:
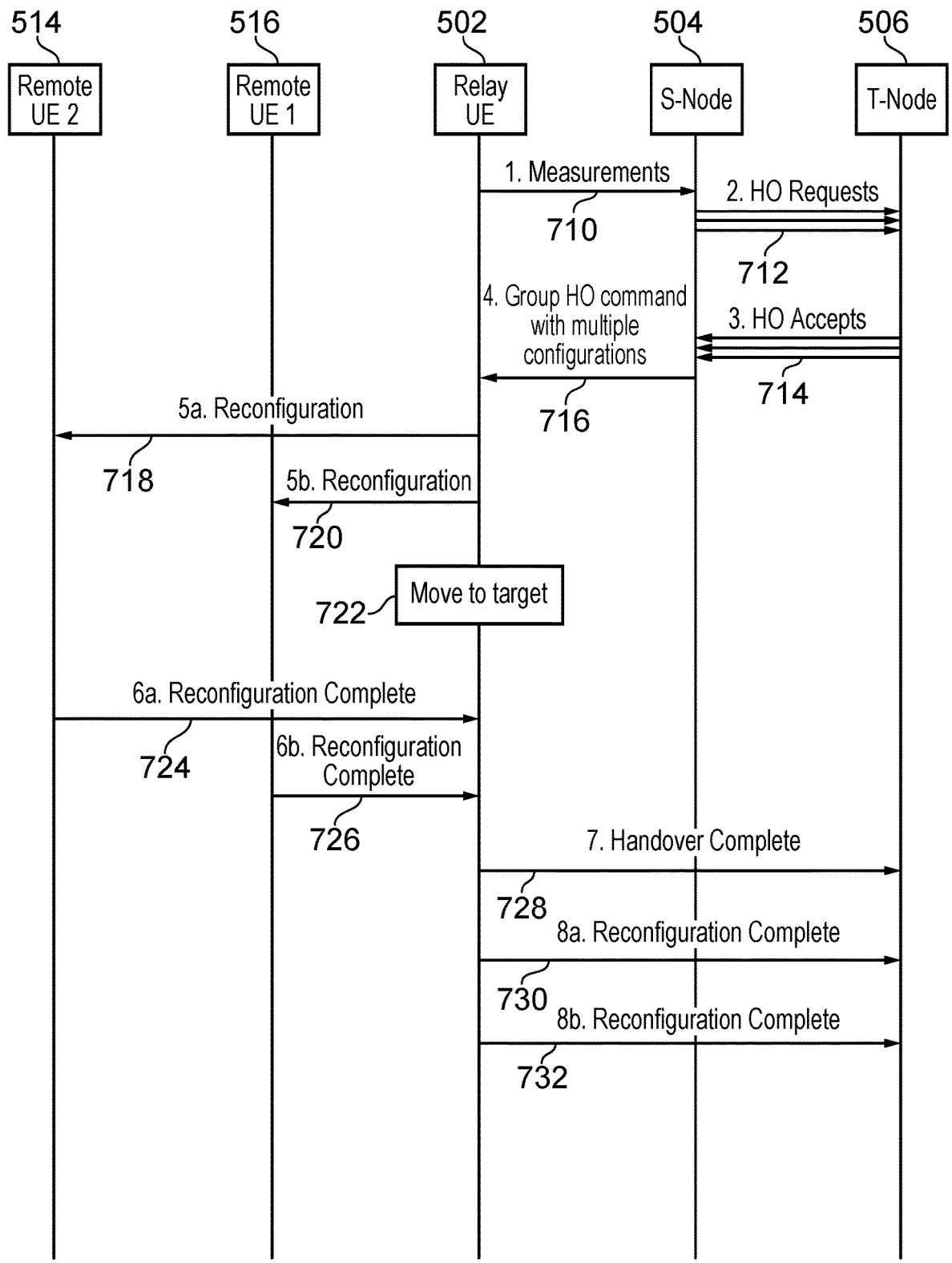
FIG. 6 shows an example of communications involved in a conventional group handover for FeD2D.

Details of the conventional handover procedure for this situation are described in FIG. 6. FIG. 6 shows an example of communications involved in a group handover for the FeD2D scenario in FIG. 5.

A "group" of UEs which are communicating with each other over sidelink interfaces can be identified by a source eNB. Once a group has been identified, the eNB may use various inputs (for example, measurement reports from one or more UEs in the group) to prepare group handover towards the most likely candidate target cell(s). This will increase the time available for handover execution, reduce the risk of handover failure, and result in more accurate resource allocation at the target cell.

A "group handover command" approach combines the reconfiguration messages for the relay UE and the remote UE(s), for over the air transmission, as shown in FIG. 6.

A relay UE 502 transmits measurements 710 to a source node 504. The measurements 710 may be a measurements regarding a quality of a radio link between the relay UE 502 and the source node 504. For example, the measurements 710 may include measurements made by the relay UE 502 on one or more objects specified by the source node 504. The measurements 710 are transmitted in a measurement report (such as measurement report 510) in response to the conditions outlined in events A3 and/or event A5 being met. In response to receiving the measurements 710, the source transmits handover requests 712 to a target node 506. As will be appreciated from FIG. 6 a separate handover request is transmitted for each of the relay UE 502, the first remote UE 516 and the second remote UE 514. In other examples, the handover request 712 may be a single message containing a request for each of the relay UE 502, the first remote UE 516 and the second remote UE 514. The target node 506 then determines whether or not to accept the handover requests 712. If the target node accepts the handover request, then it transmits separate handover acceptance messages 714 for each of the relay UE 502, the first remote UE 516 and the second remote UE 514. In other examples, the handover request acceptance 714 may be a single message containing a request acceptance for each of the relay UE 502, the first remote UE 516 and the second remote UE 514. In response to receiving the handover acceptance messages 714, the source node 504 transmits a group handover command 716 including a handover configuration for each of the relay UE, the first remote UE and the second remote UE. The relay UE 514 then transmits the configuration of the handover 718, 720 for each of the first remote UE 516 and the second remote UE 514 respectively. The configurations 718, 720 are transmitted in RRC reconfiguration messages. The relay UE 502 is then handed over 722 to the target node. Each of the first and second remote UEs 516, 514 then transmit a reconfiguration complete message 724, 726 to the relay UE 502. The reconfiguration complete is also an RRC message. The relay UE 502 then transmits a handover complete message 728 to the target node 506. The relay UE 502 then forwards the reconfiguration complete messages 730, 732 received from the first and second remote UEs 514, 516 to the target node.

As explained for the FeD2D scenario above, the relay and remote UEs all handover to the target node together.

The overall handover procedure is still based on the steps of measurement report triggering/execution, handover configuration and handover execution. Multiple handover configurations for remote UEs could be included in one group handover command.

In other examples, a handover configuration may be broadcast to one or more UEs involved in a group handover procedure. The handover configuration may be broadcast by the source node using a System Information Block (SIB). The broadcasted handover configuration information may include mobility information common to all UEs receiving the broadcast (for example, spCellConfigCommon). However, given that signaling overhead is required to give a handover command to each UE and therefore requires dedicated signaling, it is important to consider whether broadcasting the common mobility information is preferable to dedicated signaling of configurations as shown in FIG. 6.

The following criteria can to be used by the source node to evaluate whether broadcast signaling of common mobility information is preferable to dedicated signaling:

1) Will a sufficient number of UEs share the same values of common signalling to justify broadcasting values as opposed to dedicated signalling?
2) Will the same values remain valid for long enough such that they will not require frequent modification (which may occur via dedicated signalling or an updated broadcast message)?
3) How long will it take for the UE to receive the minimum required information for NTN access?

Further analysis may be performed to identify other possible signalling applicable to broadcast transmission (e.g. common delay, other parameters of the RRC Reconfiguration message), whether certain areas of the network are more suitable to broadcast signalling (e.g. at the edge of coverage between terrestrial and non-terrestrial), or whether typical handover configurations (possibly with additional delta configuration) can be provided via an index. All signalling between the UE, source node, and target node should be considered in the evaluation.

In NTN, a large number of UEs may be involved in a handover procedure given the large cell size. In this case, the reduction of overhead signalling required for the handover represents a technical challenge.

Conventional handover (for example, group handover or single UE handover) is a layer 3 procedure. In other words, conventional handover is triggered, configured, executed via RRC signalling as explained above.

Therefore the reduction of signalling overhead in conventional handover procedures (and in particular, group handover procedures) represents a technical challenge. Embodiments of the present technique introduce signalling enhancement techniques which reduce signalling overhead and accelerate handover execution applicable to both group handover and single UE handover.

Embodiments can serve to reduce signalling overhead and accelerate handover execution by predicting a handover target communications node in advance of the handover. For example, a drone base station or on-demand network deployed may be able to predict a UEs trajectory using artificial intelligence (AI). By predicting the handover target communications node in advance of the handover, embodiments can provide a network for configuring handover parameters for the UE in advance of handover execution. In some embodiments, a command for the execution of the handover may be transmitted in a trigger signal to the UE. In some embodiments, the UE may execute the handover when it enters a specific geographical region Embodiments can provide different options on the design of the trigger signalling which could be addressed to a single UE or a group of UEs. Embodiments provide a reduction in overhead signalling and acceleration in handover execution compared to conventional handover techniques as will be appreciated from the detailed disclosure below.

Handover Preparation

In some embodiments, a target node for a UE to be handed over to from a source node can be predicted in advance of a handover decision. In such embodiments, it is predicted that the target node can provide acceptable link quality to one or more UEs within its coverage area.

In some embodiments, in a case in which a network is overloaded in an area in which there is a high demand for wireless communications such as a stadium, shopping mall or downtown area, one or more UEs may need to be offloaded to a complementary node which is already deployed in the downtown area and which has a coverage area which intersects with a coverage of the source node at least in part. In some embodiments, the complementary node is a drone base station/infrastructure equipment or one which is deployed on an ad hoc basis for example to cope with a bespoke event. In such embodiments, the target node would is a "backup" base station. In such embodiments, the target node may be predicted to be the complementary drone base station in advance of the handover decision.

In some embodiments, an on-demand network or a temporary network is deployed. In such embodiments, one or more UEs may attempt to receive a special service. In such embodiments, the target handover node is any communications node which is configured to provide the special service. For example, a user of a UE may be scheduled to attend a theatre for a musical. The musical may have an associated online special service which may indicate an identity of the performers, songs to be played, timings of performances or the like. When the user is at the theatre for the musical, the service will only be accessible via nodes with a coverage area including the theatre. One of the nodes with a coverage area including the theatre may therefore be selected to be the target node.

In some embodiments, UE's trajectory and/or location may be known or predictable by Artificial Intelligence (AI). In such embodiments, the target node may be any node (e.g. gNB, eNB etc) which has a coverage area covering a predicted trajectory of the UE.

Figure 7A:
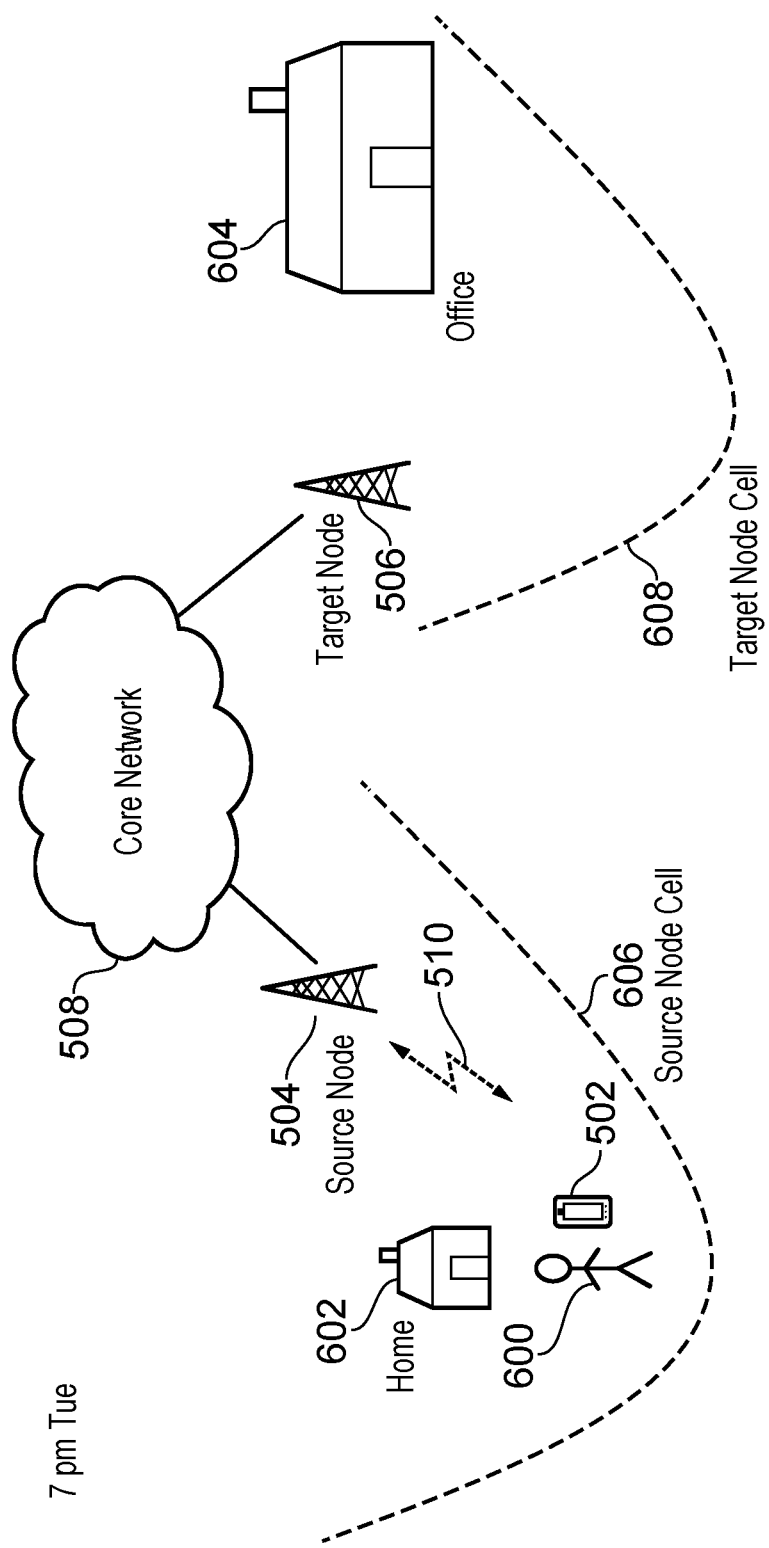
FIGS. 7A and 7B are a schematic diagrams illustrating how a target node may be predicted in accordance with exemplary embodiments.
Figure 7B:
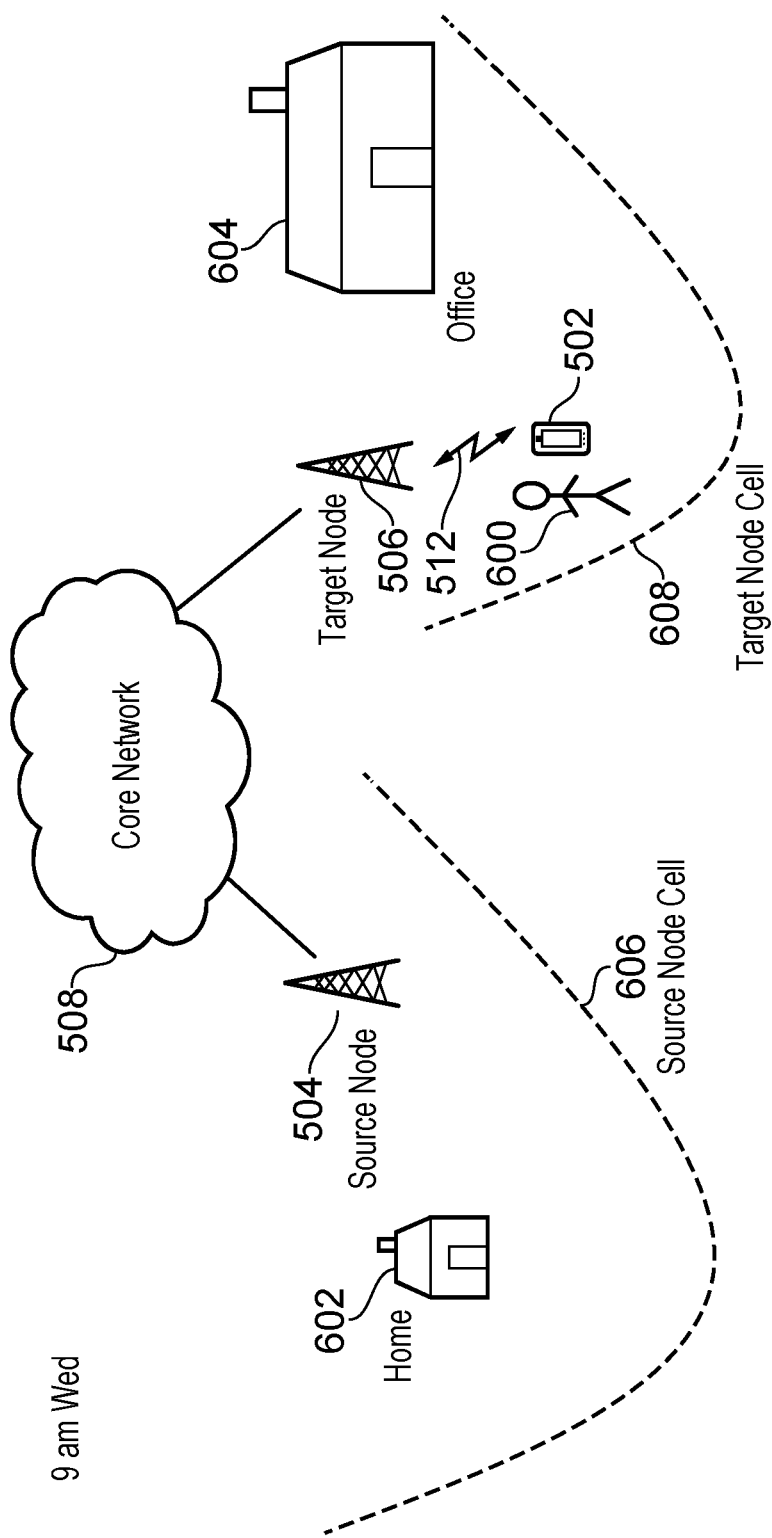

FIGS. 7A and 7B illustrate an example scenario in which a trajectory of a UE may be predicted in accordance with exemplary embodiments. FIGS. 7A and 7B are based on FIG. 3 but further include a user 600 of the smartphone 502 who, in FIG. 7A, is at home 602 which is within a coverage area 606 of a source node 504 and, in FIG. 7B, is at an office 604 which is within a coverage area 608 of the target node in FIG. 7B.

The user 600 may be an office worker who travels to and from home 602 to the office 604 for work from Monday to Friday, 9 am to 5 pm every week. Therefore, if the user 600 is currently at home 602, the source node 504 may predict that the user 600 will be at the office 604 (and therefore within the coverage area 608 of the target node 506) at a future time. For example, FIG. 7A depicts the user 600 at home 602 on a Tuesday evening. The source node 604 may therefore predict that the user 600 will be at the office around 9 am the next day (shown in FIG. 7B). Therefore the source node 504 may predict that the smartphone 502 should be handed over to the target node around 9 am the next day.

In other examples, the source node may be aware that a user of a smartphone is scheduled to attend an event at a particular point in time (e.g. a soccer match held in a stadium). The source node is consequently able to predict that the smartphone of the user should handover from the source node to a target node with a coverage area including a location of the stadium at the time at which the soccer match is scheduled to occur.

In such embodiments as described above, in which the target node is predictable in advance of a handover decision, a source node may pre-configure the handovers which are predicted to occur at a future point.

In such embodiments, when a target node has been predicted, the source node may negotiate with the target node for handover parameters before the pre-configuration. In such embodiments, a measurement report is not required to be transmitted or triggered as in conventional handover. In other words, there is no requirement for the UE to perform radio link measurement with the source node in order to determine whether events A3/A5 are met to trigger transmission of the measurement report.

Handover Configuration

In some embodiments, a source node will send handover configuration to one or more UEs to be handed over at a future point. Hereinafter the handover configuration in such embodiments will be referred to as a "pre-configuration". The pre-configuration may include, for example, target cell ID, RACH resources or the like. The pre-configuration may be transmitted using an RRC reconfiguration message. In contrast to conventional handover, the handover pre-configuration in such embodiments will not include a command to perform a handover or, in the case of conditional handover, radio-link conditions to be measured by the UE which, if met, cause the handover to be performed. In other embodiments the pre-configuration conditions may be combined with measurements to trigger a handover.

In some embodiments, the source node may set a trigger for handover to a trigger signal as explained below. The trigger signal for handover may include a command for the UE to perform the handover from the source node to the target node based on the pre-configuration.

In other embodiments, the pre-configuration message may include a position condition. In such embodiments, the UE may be handed over from the source node to the target node if the UE determines that its location matches the position condition included in the pre-configuration message.

Handover Trigger

In embodiments the source node may set a physical layer signal as a trigger for the handover as will be explained below.

Physical Layer Signal

In some embodiments, Downlink Control Information (DCI) may be transmitted from the source node to one or more UEs. If the DCI is addressed to a specific UE, it may include a Cell Radio Network Temporary Identifier (C-RNTI) for identifying the UE. If the DCI is addressed to a group of UEs, it may include a Group Radio Network Temporary Identifier (Group-RNTI) for identifying a group of UEs. gNBs may allocate Group-RNTI in addition to C-RNTI for a UE with RRC signalling. C-RNTI is a unique identifier for a UE in a cell, while Group RNTI is a unique identifier for a group of UEs in a cell. The DCI may include an instruction for the one or more UEs receiving the DCI to perform handover. The instruction may be indicated by a bit in the DCI which signals which UEs would perform handover.

UEs instructed to perform handover may then perform the handover based on the pre-configuration received previously. In this way, handover execution can be accelerated compared to conventional handover. Furthermore overhead signalling can be reduced in handover by removing the need to transmit a measurement configuration and measurement report as in conventional handover procedures as discussed above. Specifically, conventional handover uses Layer 3 (L3) RRC signalling to both configure and command the handover. In conventional conditional handover, RRC signalling is used to configure the handover and provide conditions for handover. By contrast, embodiments of the present technique allow a pre-configuration to be transmitted by RRC signalling by predicting which target node a UE may handover to at a future point. The execution of the handover is triggered by a Layer 1 (L1) physical layer signalling, resulting in an accelerated handover execution compared to conventional techniques.

As will be appreciated by one skilled in the art, the UE, source node and target node contain logical protocol entities in user plane and control plane protocol stacks which may be configured to operate in accordance with example embodiments of the present technique. The Annex to this Specification provides additional information on the control plane protocol stacks for a UE and a gNB (which is an example of a source node) which may be configured to operate in accordance with example embodiments of the present technique.

As will be appreciated, RRC messages (such as the pre-configurations and reconfigurations messages) are generated at the RRC layer. DCI is generated at the PHY layer. Since the RRC layer is at a higher logical layer than the PHY layer, then the combination of processing time and transmission time for a DCI signal is less than for an RRC message. Therefore, by including the trigger signal in the DCI signal as suggested above, handover execution can be accelerated.

In embodiments the source node may include the trigger for the handover in a System Information Block (SIB) as will be explained below.

System Information

In some embodiments, the source node may transmit system information to one or more UEs. The system information may include an instruction to perform handover. For example, the system information may be included in a System information Block Type 1 (SIB1) or in an on-demand System Information Block (SIB). The SIB1 or SIB may include a bit to indicate whether the pre-configured handover should be performed. In such embodiments, the UEs which received pre-configured handover command should perform handover when the bit is set to true. UEs which did not receive a pre-configuration will ignore this bit.

In such embodiments, signalling overhead can be reduced compared with conventional handover. In particular, it will be appreciated by the skilled person that SIBs are broadcasted periodically by the source node to UEs being served by it. Therefore, by including the trigger signal in the SIB, the requirement for a separate trigger signal to trigger the handover is removed, thereby reducing overhead.

In some embodiments the source node may set a paging message as a trigger for the handover as will be explained below.

Paging Message

In some embodiments, the source node may transmit a paging message to one or more UEs. The paging message may include an instruction to perform handover. For example a bit in the paging message (e.g. in the Pagingrecord) can indicate that a UE needs to perform the handover. For example, one or more UEs will perform handover when a bit in the paging message associated with its C-RNTI is set to true. With this option, the network can control which and how many UEs should handover to the target cell. In this way, if more than one UE is to be handed over, the paging message can indicate which and how many UEs are to be handed over. Therefore RACH collisions when UEs handover to the same target cell can be minimised. UEs in RRC_Connected mode, will check the paging message in any paging occasion.

In some embodiments, the source node may transmit the trigger signal if the network is overloaded, experiencing congestion or is attempting to perform load balancing.

In some examples, a user of UE may prefer to receive a specific service. In other words, the UE may prefer to receive a service according to a scheduled event when the UE enters a specific area. In an example, as introduced above, the UE may wish to receive a special service associated with a musical in a theatre which the user of the UE is scheduled to attend. As explained above, the source node may select a target node which is configured to provide the special service to the UE. When the UE enters the theatre, the UE is handed over to the selected target node. This may be triggered by the UE if it detects, based on its location, that it has entered the theatre. Alternatively, the source node may detect that the UE has entered the theatre and transmits a trigger signal to the UE in response. In order to reduce RACH collisions as more than one UE initiate a RACH procedure with the target node, the network may adopt "staggered entry". In other words, the network may transmit trigger signals triggering handover for a small group of UEs during a first time period and may transmit additional trigger signals triggering handover for another small group of UEs during a second time period.

In some examples, the source node transmits the trigger signal to a UE (or a group of UEs) when it is determined that the UE (or group of UEs) is going to move into a coverage area of the target cell. In such embodiments, the network may transmit a trigger signal including a handover trigger on a basis of UE position information. In some embodiments, the UE may transmit the position information to the network.

Figure 8:
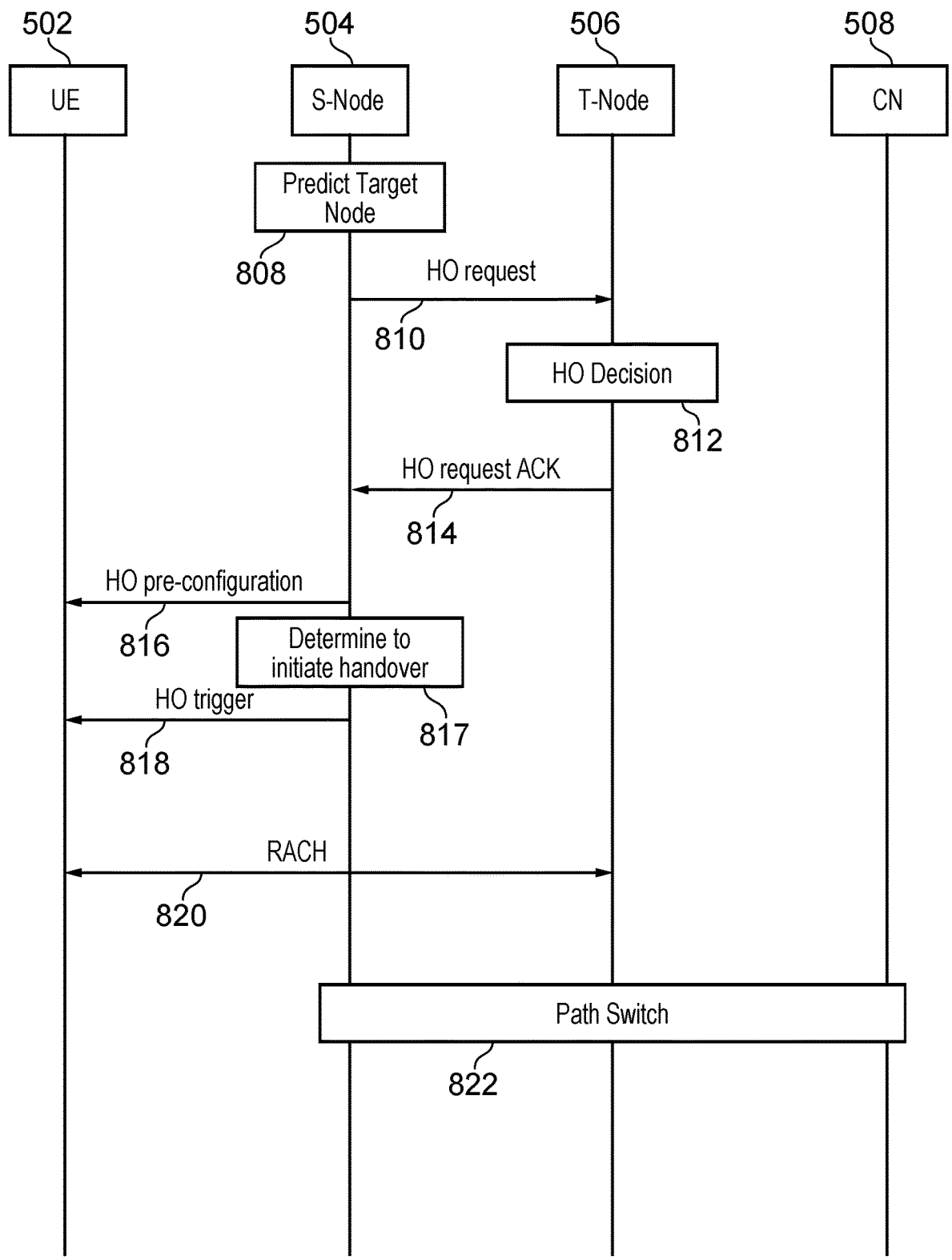
FIG. 8 illustrates an example scenario in which a pre-configuration message and a trigger signal are transmitted to a UE in accordance with some embodiments.

FIG. 8 illustrates an example scenario in which a pre-configuration message and a trigger signal are transmitted to a UE in accordance with some embodiments. A source node 504 predicts 808 a target node 506 on a basis of a predicted location of a UE 502 at a future time. In other words, the source node may select a node as a target node because it predicts that a UE 502 currently being served by the source node 504 will be served by the target node 506 at a future time. The source node 504 may predict the target node 506 as explained above. The source node 504 sends a handover request 810 to a target node 506.

The target node 506 then determines whether or not to authorise the handover on a basis of the handover request 810 and makes a handover decision 812. The target node then transmits a handover request acknowledgement 814 to the source node 504 including an indication of radio resources reserved for the UE 502 (for example, RACH resources). The source node 504 then transmits a handover pre-configuration 816 to the UE 502. As explained above, the pre-configuration may include, for example, target cell ID, RACH resources reserved for the UE 502 or the like.

At a later time the source node 504 may determine 817 that the UE 502 should be handed over to the target node 506. This may occur because (following the example set out in FIGS. 7A and 7B), the user of the smartphone leaves the home and arrives at the office. In the other example discussed above, the source node may determine that the UE 502 should be handed over to the target node 508 because it detects that the user of the UE 502 has entered the soccer stadium. In other words, the source node 504 detects that the UE 502 device satisfies a pre-defined position condition. In embodiments where the source node uses the position of the UE 502 to determine whether to transmit the trigger signal, the UE 502 may transmit its location to the source node 504. In some embodiments, the UE 502 may transmit an uplink reference signal so that the source node 504 may be aware of the location of the UE without an explicit location report. In some embodiments, the source node may transmit the trigger signal if the network is overloaded, experiencing congestion or is attempting to perform load balancing.

In response to determining that the UE 502 should handover from the source node 504 to the target node 506, the source node 504 transmits a signal including a trigger 818 commanding the UE 504 to perform the handover. If the source node 504 has sent a pre-configuration to multiple UEs then it may transmit a first trigger signal to a first group of the UEs during a first time period and a second trigger signal to a second group of UEs during a second time period. This "staggered entry" approach may reduce RACH collisions between the multiple UE when the multiple UEs are handed over.

The trigger signal may be any one of the handover triggers as explained above. The UE 502 which received the trigger signal (having previously received a pre-configuration) then initiates a RACH procedure 820 with the target node 506 to establish a connection. The source node 504 then informs a core network 508 of the path switch 822.

Figure 9:
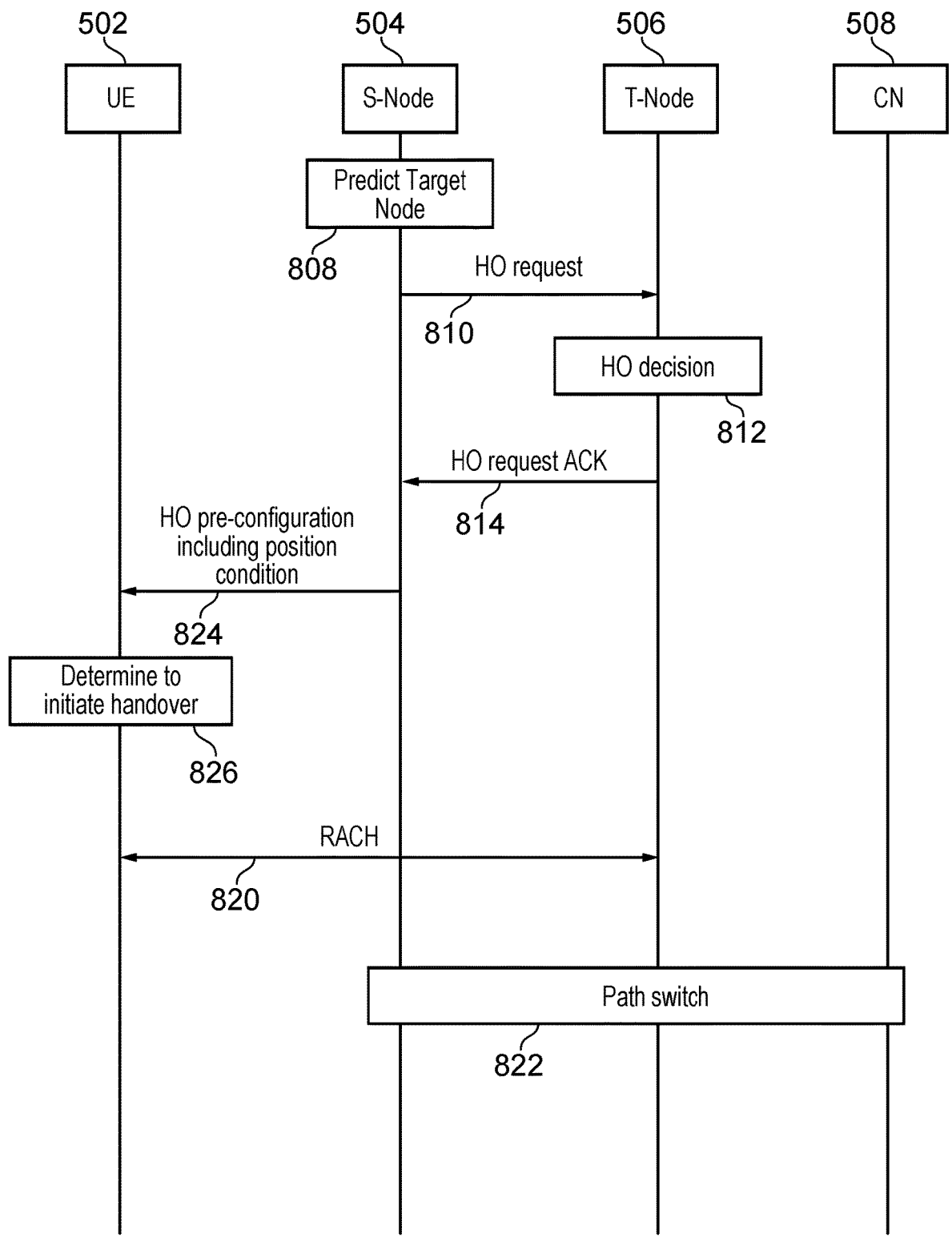
FIG. 9 illustrates an example scenario in which a trigger for the handover is included in a pre-configuration message in accordance with some embodiments.

FIG. 9 illustrates an example scenario in which a trigger for the handover is included in a pre-configuration message in accordance with some embodiments. As will be appreciated FIG. 9 broadly corresponds to FIG. 8. However, in FIG. 9, a pre-configuration message 824 including a position condition is transmitted to the UE 502. Additionally, if the UE 502 determines 826 that the position condition is met then the UE 502 initiates the handover. The position condition may outline a location range. If the UE 502 determines (from a Global Positioning System (GPS) chip in the UE 502 or similar location monitoring chip) that its location is within the location range, then it determines that the position condition is met. This may occur because (following the example set out in FIGS. 7A and 7B), the user of the smartphone leaves the home and arrives at the office. In the other example discussed above, the UE 502 may determine that that the position condition is met because it detects that the user of the UE 502 has entered the soccer stadium to attend the scheduled soccer match.

Figure 10:
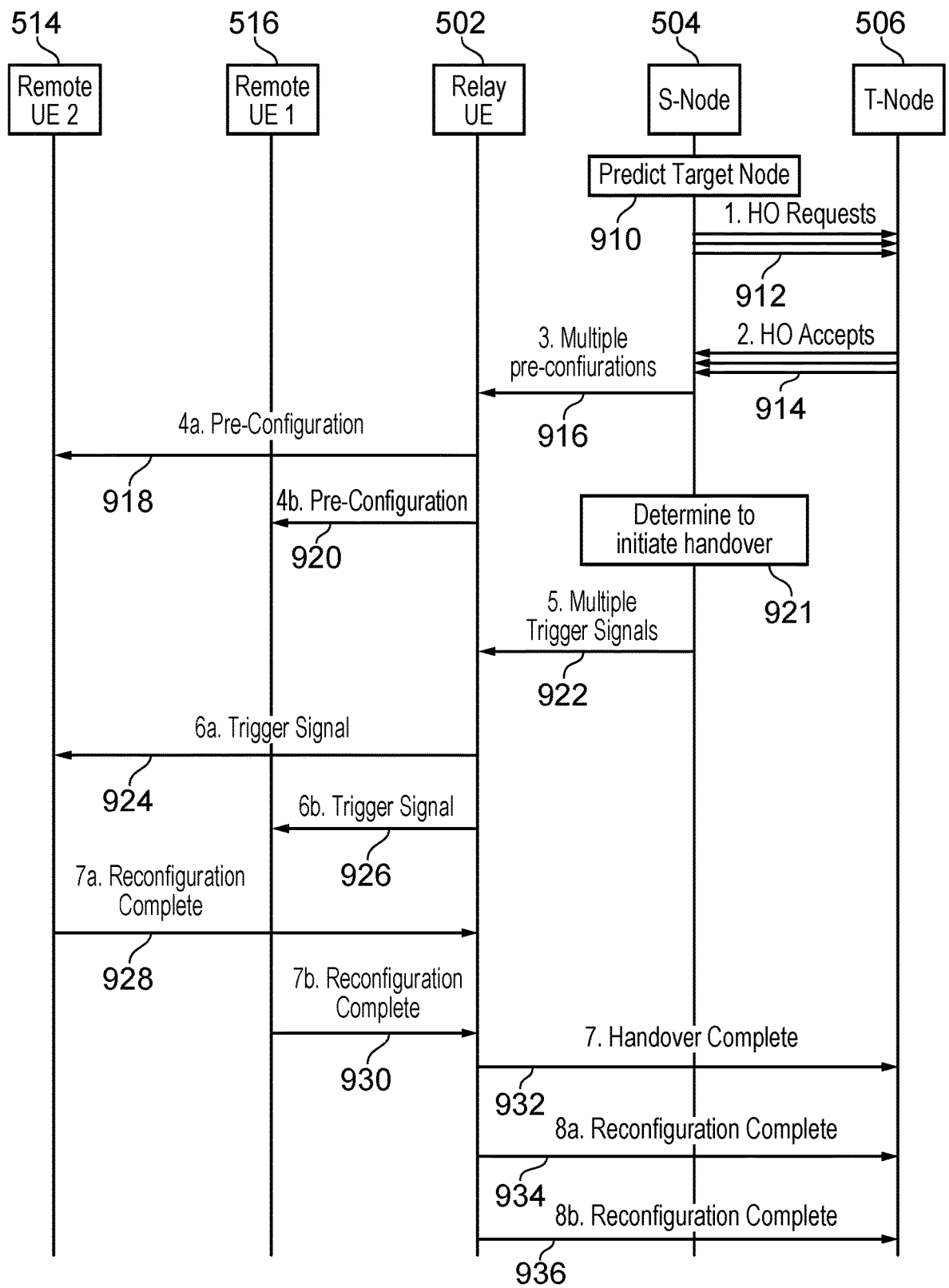
FIG. 10 illustrates an example scenario in which a pre-configuration message and a trigger signal are transmitted to a group of UEs in accordance with some embodiments.

FIG. 10 illustrates an example scenario in which a pre-configuration message and a trigger signal are transmitted to a group of UEs communicating using side link interfaces in accordance with some embodiments.

A source node 504 predicts 910 a target node 506 on a basis of a predicted location of a UE 502 at a future time. In other words, the source node may select a node as a target node because it predicts that a UE 502 currently being served by the source node 504 will be served by the target node 506 at a future time. The source node 504 may predict the target node 506 as explained above. The source node 504 transmits handover requests 912 to a target node 506. As explained above, the target node 506 may be predicted in advance by the source node 504. As will be appreciated from FIG. 10 a separate handover request is transmitted for each of the relay UE 502, the first remote UE 516 and the second remote UE 514. The target node 506 then determines whether or not to accept the handover requests 912. If the target node accepts the handover requests, then it transmits separate handover acceptance messages 914 for each of the relay UE 502, the first remote UE 516 and the second remote UE 514. In response to receiving the handover acceptance messages 914, the source node 504 transmits a pre-configuration message 916 including a handover pre-configuration for each of the relay UE 502, the first remote UE 516 and the second remote UE 514. The relay UE 502 then forwards the pre-configuration of the handover 918, 920 for each of the relay UE 502, the first remote UE 516 and the second remote UE 514 respectively. In some embodiments, the relay UE 502 may determine whether or not to transmit pre-configuration messages to each of the first remote UE 516 and the second remote UE 514. The pre-configurations 918, 920 are transmitted in RRC reconfiguration messages.

At a later point in time, the source node 504 may determine 921 that the relay UE 502, the first remote UE 516 and the second remote UE 514 should be handed over to the target node 506. In response to this determination, the source node may transmit a trigger signal message 922 including trigger signal 924, 926 for each of the relay UE 502, the first remote UE 516 and the second remote UE 514. The relay UE 502 then transmits the trigger signals 924, 926 to the first remote UE 516 and the second remote UE 514 respectively. In some embodiments, the relay UE 502 may determine whether or not to the transmit trigger signals 924, 926 to each of the first remote UE 516 and the second remote UE 514. In some embodiments, the source node may transmit the trigger signals 924, 936 to the first and second remote UE respectively. The relay UE 502 is then handed over to the target node 506. Each of the first and second remote UEs 516, 514 then transmit a reconfiguration complete message 928, 930 to the relay UE 502. The reconfiguration complete messages 928, 930 are RRC messages. The relay UE 502 then transmits a handover complete message 932 to the target node 506. The relay UE 502 then forwards the reconfiguration complete messages 934, 936 received from the first and second remote UEs 514, 516 to the target node.

In other embodiments, the pre-configuration message includes a position criterion to trigger the handover. For example, the UE receiving the pre-configuration triggers the handover when it enters a predefined geographical area (e.g.

musical theatre, studio etc.). In such embodiments, the execution of handover does not occur as a result of a poor quality radio link between the UE and the source node as in conventional handover. In some embodiments, the criterion to trigger the handover included in the pre-configuration message may include both a position condition and a radio link quality condition. For example, the execution of the handover may be triggered when the UE enters a predefined geographical area and the Reference Signal Receive Power (RSRP) of radio link is above a pre-defined threshold.

Embodiments of the present technique can reduce the handover signalling (for example, there is no longer a need to send a measurement report or UL reference signal); reduce UE power consumption (for example, there is no need for the UE to perform the measurements which would be included in the measurement report); accelerate handover execution (for example, lower layer signalling can be introduced); and simplify control of group handover from the network perspective.

In other embodiments, a communications node, which may be an infrastructure equipment or a UE acting as a relay node, may be configured to form part of a radio access network of a wireless communications network. The communications node comprises transceiver circuitry configured to transmit signals to one or more UEs and to receive signals from the one or more UEs via a wireless access interface, and controller circuitry configured to control the transceiver circuitry. The communications node is configured to act as a source communications node for at least one of the one or more UEs and the control circuitry is configured to control the transmitter to transmit a handover pre-configuration message to the one or more UE providing a configuration for a handover of the one or more UE from the source communications node to another communications node to form a target communications node when available, to determine that the target communications node is available to act to receive signals from or to transmit signals to the one or more UEs via the wireless access interface and to form part of the radio network of the wireless communications network, and to transmit by the source communications node, to the one or more UEs a trigger instructing the one or more UEs to handover from the source communications node to the target communications node.

In some examples the control circuitry is configured to control the transmitter circuitry to transmit the handover pre-configuration message comprising an indication of a trigger signal, which includes an instruction to the UE to handover from the source communications node to the target communications node in response to the trigger signal when the target communications node is available.

According to these example embodiments, a wireless communications network may deploy a target node, which may be for example a temporary or ad hoc base station, which could be a drone, which may be deployed to cope with an increase in communications traffic. This may be because for example a bespoke event such as a concert or a sporting event, which requires extra capacity, can cause congestion or overloading of an existing radio access network and so an infrastructure equipment can be deployed as a communications node of the radio access network. In order for a network to make efficient use of the deployed target node, a source communications node which may be an existing and established infrastructure equipment in a vicinity of likely congestion, transmits a handover pre-configuration message. The pre-configuration message includes information for one or more UEs to handover to the target communications node when this is deployed. The handover may be triggered by the source communications node transmitting a trigger signal.

In some examples the one or more UEs may be a plurality of UEs divided into groups of UEs, and the pre-configuration handover message identifies the group to which the UE belongs for which the handover is executed by the trigger signal. As indicated for the above embodiments the trigger signal could be a paging signal, SIB or RRC message. As for the above embodiments the handover can include a group handover command.

Example embodiments can provide a communications device configured to operate in a wireless communications network, the communications device comprising
  transceiver circuitry configured to transmit signals to the wireless communications network and to receive signals from the wireless communications network transmitted via a wireless access interface provided by the wireless communications network, and
  controller circuitry configured to control the transceiver circuitry, wherein the control circuitry is configured
  to control the transceiver to receive a pre-configuration message from the wireless communications network including a configuration for the handover of the communications device from a source communications node to a target communications node at a future time, the communications device being selected to handover from the source communications node to a target communications node at the future time on a basis of a predicted location of the communications device at the future time;
  and
  to receive a trigger instructing the communications device to handover from the source communications node to the target communications node at the future time.

Example embodiments can also provide a communications device configured to operate in a wireless communications network, the communications device comprising
  transceiver circuitry configured to transmit signals to the wireless communications network and to receive signals from the wireless communications network transmitted via a wireless access interface provided by the wireless communications network, and
  controller circuitry configured to control the transceiver circuitry, wherein the control circuitry is configured
  to control the transceiver circuitry to receive a handover pre-configuration message from the wireless communications network providing a configuration for a handover of the communications device from a source communications node to another communications node, which is to form a target communications node when available for the communications device, and
  to receive from the source communications node a trigger instructing the communications device to handover from the source communications node to the target communications node, the source communications node determining that the target communications node is available to act to receive signals from or to transmit signals to the communications device via the wireless access interface forming part of the radio network of the wireless communications network.

Figure 11:
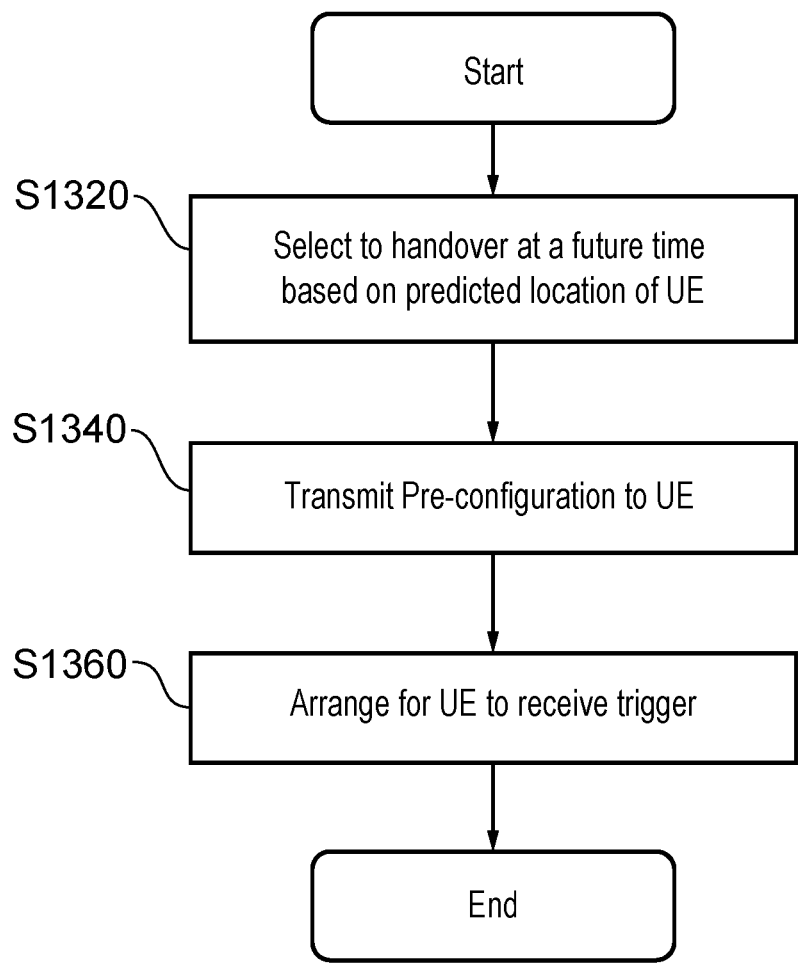
FIG. 11 is a flow diagram illustrating a processing procedure performed by a source communications node according to example embodiments.

FIG. 11 is a flow diagram illustrating a processing procedure performed by a source communications node according to example embodiments. In particular, FIG. 11 illustrates a method of operating a source communications node of a wireless communications network for controlling handover of a communications device (such as a UE) from the source communications node to a target communications node of the wireless communications network. After a start point, the method proceeds to step S1320 and the source communications node selects, using control circuitry, to handover the communications device from the source communications node to the target communications node at a future time on a basis of a predicted location of the communications device at the future time. In example embodiments, the source node determines that the target node will be able to provide better coverage for the communications device than the source node at the future time. For example, it may be predicted that the communications device will be closer to the target node than the source node at the future time. In such a way, the source node anticipates that it will be desirable for the communications node to handover form the source to the target at the future time.

In step S1340, the source communications node transmits, using transmitter circuitry in combination with the control circuitry, a pre-configuration message to the communications device including a configuration for the handover of the communications device from the source communications node to the target communications node at the future time. In other words, the source node provides the communications device with the pre-configuration in advance of the handover. In other words, the source node prepares the communications device for the handover to the target node which may occur at the future time if a trigger is received.

In step S1360, the source communications node arranges, using the transmitter circuitry in combination with the control circuitry, for the communications device to receive a trigger instructing the communications device to handover from the source communications node to the target communications node at the future time. In example embodiments, the source node sends an explicit trigger signal to the communications device to trigger the handover. In other example embodiments, the source node includes a condition in the pre-configuration which the communications device uses to trigger the handover if the condition is met. The trigger initiates the handover of the source node to the target node, the communications device having already been configured for the handover in the pre-configuration message because the source node had anticipated that the communications device would handover to the target node at the future time. In examples where the position of the communications device was incorrectly predicted, the communications device may not receive a trigger for the handover. For example, the position of the communication device may be predicted on a basis of an existing schedule for a user of the device. If the user departs from the schedule on a particular day, the prediction may be incorrect. In such examples, conventional handover techniques may be used to determine whether a handover is required to a different target node. After step S1360, the method ends.

Figure 12:
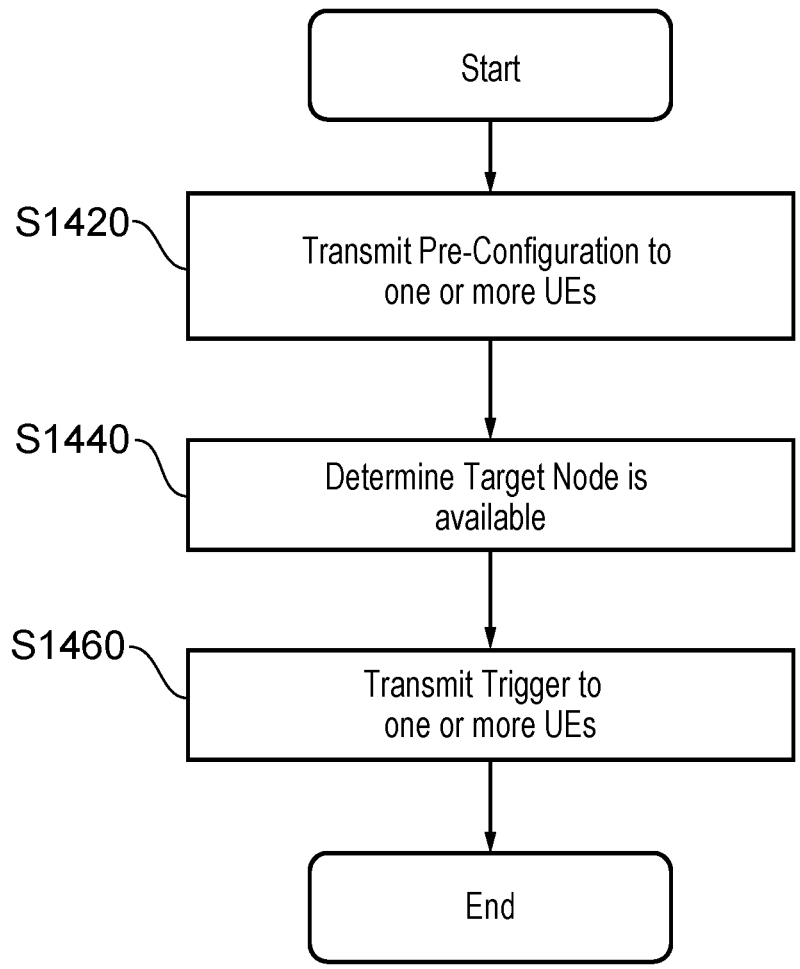
FIG. 12 is a flow diagram illustrating a processing procedure performed by a source communications node according to example embodiments.

FIG. 12 is a flow diagram illustrating a processing procedure performed by a source communications node according to example embodiments. In particular, FIG. 12 illustrates a method of operating a source communications node of a wireless communications network for controlling handover of one or more communications devices. After a start point, the method proceeds to step S1420 and the source communications node transmits a handover pre-configuration message to the one or more communications devices providing a configuration for a handover of the one or more communications devices from the source communications node to another communications node to form a target communications node when available. In other words, the source node provides one or more communications devices with the pre-configuration in advance of the handover. In other words, the source node prepares the one or more communications devices for the handover to the target node which may occur at the future time if a trigger is received.

In step S1440, the source communications node determines that the target communications node is available to act to receive signals from or to transmit signals to the one or more communications devices (such as UEs) via a wireless access interface and to form part of a radio network of the wireless communications network. In other words, the source node may determine that the target node is available for accepting the one or more communications devices to be handed over from the source node to the target node. In such cases, the target node may be a drone base station for example which may be deployed in an area near the source base station. For example, the target node may be considered available by the source node if the target node is within a pre-defined distance of the one or more communications devices. The source node may receive an indication from the target node that it is available. In one example, the target node may be deployed to provide extra capacity so that the handover pre-configuration prepares one of more communications devices to handover to the target communications node when this is deployed perhaps, for example, to relieve congestion.

In step S1460, the source communications node transmits, to the one or more communications devices a trigger instructing the one or more communications devices to handover from the source communications node to the target communications node. For example, the source node may transmit the trigger in response to determining that the target node is available and that there is an overload on the wireless communications network. Such examples enable load balancing between the source node and the target node. After step S1460, the method ends.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIOT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports a dynamic scheduling of shared communications resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a source communications node of a wireless communications network for controlling handover of a communications device from the source communications node to a target communications node of the wireless communications network, the method comprising selecting, by control circuitry in the source communications node, to handover the communications device from the source communications node to the target communications node at a future time on a basis of a predicted location of the communications device at the future time;

transmitting, by transmitter circuitry in combination with the control circuitry in the source communications node, a pre-configuration message to the communications device including a configuration for the handover of the communications device from the source communications node to the target communications node at the future time; and arranging, by the transmitter circuitry in combination with the control circuitry in the source communications node, for the communications device to receive a trigger instructing the communications device to handover from the source communications node to the target communications node at the future time.

Paragraph 2. A method according to paragraph 1, wherein the arranging, by the transmitter circuitry in combination with the control circuitry in the source communications node, for the communications device to receive the trigger instructing the communications device to handover from the source communications node to the target communications node at the future time comprises transmitting, by the transmitter circuitry in combination with the control circuitry in the source node at the future time, a trigger signal to the communications device including an instruction to the communications device to handover from the source communications node to the target communications node in response to the trigger signal.

Paragraph 3. A method according to paragraph 2, wherein the trigger signal is a physical layer signal.

Paragraph 4. A method according to paragraph 2 or 3, wherein the trigger signal is included in Downlink Control Information (DCI) addressed to the communications device using either a Group Radio Network Temporary Identifier (Group-RNTI) or Cell Radio Network Temporary Identifier (C-RNTI).

Paragraph 5. A method according to paragraph 2, wherein the trigger signal is included in system information transmitted to the communications device.

Paragraph 6. A method according to paragraph 2, wherein the trigger signal is included in a paging message transmitted to the communications device.

Paragraph 7. A method according to any of paragraphs 2 to 6, wherein the transmitting, by the transmitter circuitry in combination with the control circuitry in the source communications node at the future time, the trigger signal to the communications device including the instruction to the communications device to handover from the source communications node to the target communications node comprises determining, by the control circuitry in the source communications node, that a load on the source node has exceeded a predetermined threshold, and in response transmitting, by the transmitter circuitry combination with the control circuitry in the source communications node, the trigger signal to the communications device.

Paragraph 8. A method according to paragraph 7, wherein the determining, by the control circuitry in the source communications node that the load on the source communications node has exceeded a pre-determined threshold comprises, receiving, by receiver circuitry in combination with the control circuitry in the source communications node, an indication that the load on the source node has exceeded the predetermined threshold, and determining that the load on the source communications node has exceeded the predetermined threshold based on the received indication.

Paragraph 9. A method according paragraph 7, wherein the determining, by the control circuitry in the source communications node that the load on the source communications node has exceeded a pre-determined threshold comprises, measuring, by the control circuitry in the source communications node, that the load on the source node has exceeded the predetermined threshold, and determining that the load on the source communications node has exceeded the predetermined threshold based on the measurement.

Paragraph 10. A method according to any of paragraphs 2 to 6, wherein the transmitting, by transmitter circuitry in combination with the control circuitry in the source communications node, the trigger signal to the communications device including the instruction to the communications device to handover from the source communications node to the target communications node comprises
  receiving, by receiver circuitry in combination with control circuitry in the source communications node, a request for a service from the communications device,
  determining, by the control circuitry in the source communications node, that the service cannot be provided by the source communications node and that the service can be provided by the target communications node, and in response
  transmitting, by the transmitter circuitry in combination with the control circuitry in the source communications node, the trigger signal to the communications device to the communications device.

Paragraph 11. A method according to paragraph 10, wherein the determining, by the control circuitry in the source communications node, that the service cannot be provided by the source node and that the service can be provided by the target node comprises
  receiving, by receiver circuitry in combination with the control circuitry in the source communications node, an indication that the service cannot be provided by the source communications node and that the service can be provided by the target node and
  determining that the service cannot be provided by the source communications node and that the service can be provided by the target communications node based on the received indication.

Paragraph 12. A method according to paragraph 10, wherein the determining, by the control circuitry in the source communications node, that the service cannot be provided by the source node and that the service can be provided by the target node comprises
  detecting, by the control circuitry in the source communications node, that the service cannot be provided by the source communications node and that the service can be provided by the target node and
  determining that the service cannot be provided by the source communications node and that the service can be provided by the target communications node based on the detection.

Paragraph 13. A method according to any of paragraphs 2 to 6, wherein the transmitting, by transmitter circuitry in combination with the control circuitry in the source communications node, the trigger signal to the communications device including the instruction to the communications device to handover from the source communications node to the target communications node comprises
  receiving, by receiver circuitry in combination with control circuitry in the source communications node, a location of the communications device from the communications device;
  receiving, by receiver circuitry in combination with control circuitry in the source communications node, a location of the target communications node from the target communications node;
  determining, by control circuitry in the source communications node, that a distance of the communications device from the target communications node is less than or equal to a pre-defined threshold and, in response,
  transmitting, by the transmitter circuitry in combination with control circuitry in the source communications node, the trigger signal to the communications device.

Paragraph 14. A method according to any of paragraphs 1 to 12, wherein the arranging, by the transmitter circuitry in combination with the control circuitry in the source communications node, for the communications device to receive the trigger instructing the communications device to handover from the source communications node to the target communications node at the future time comprises
  including, by the control circuitry in the source communications node, a position trigger in the pre-configuration message, the position trigger being used by the communications device to trigger the handover from the source communications node to the target communications node if the communications device detects that its location satisfies a pre-defined position condition included in the position trigger.

Paragraph 15. A method according to paragraph 10, wherein the including, by the control circuitry in the source communications node, the position trigger in the pre-configuration message, the position trigger being used by the communications device to trigger the handover from the source communications node to the target communications node if the communications device detects that its location satisfies a pre-defined position condition included in the position trigger comprises
  including, in the pre-configuration message, one or more pre-defined radio link quality conditions for at least one of a first radio link between the communications device and the source communications node and a second radio link between the communications device and the target communications node, the one or more pre-defined radio link quality conditions being used by the communications device in combination with the position trigger to trigger the handover from the source node to the target node if the communications device detects that its location satisfies the pre-defined condition included in the position trigger and the communication device detects that the one or more pre-defined radio link quality conditions are satisfied.

Paragraph 16. A method according to paragraph 15, wherein the one or more pre-defined radio link quality conditions include a first radio link quality of the first radio link between the communications device and the source communications node being below a first pre-defined threshold.

Paragraph 17. A method according to paragraph 16, wherein the one or more pre-defined radio link quality conditions include a second radio link quality of the second radio link between the communications device and the target communications node being above a second pre-defined threshold.

Paragraph 18. A method according to paragraph 15, wherein the one or more pre-defined radio link quality conditions comprises a second radio link quality of the second radio link between the communications device and the target communications node exceeding the first radio link quality of the first radio link between the communications device and the source communications node by an offset amount.

Paragraph 19. A method according to paragraph 15, wherein the one or more pre-defined radio link quality conditions comprises a radio link quality of the second radio link between the communications device and the target communications node exceeding a predetermined threshold.

Paragraph 20. A method according to any of paragraphs 1 to 19, wherein the selecting, by the control circuitry in the source communications node, to handover the communications device from the source communications node to the target communications node at the future time on the basis of the predicted location of the communications device at the future time comprises
  receiving, by receiver circuitry combination with control circuitry in the source communications node from the communications device, a location of the communications device over a measuring time period and using, by the control circuitry in the source communications node, the location of the communications device over the measuring time period to predict the location of the communications device at the future time.

Paragraph 21. A method according to paragraph 20, wherein the location of the communications device at the future time is predicted using Artificial Intelligence (AI) trained using the received location of the communications device over the measuring time period.

Paragraph 22. A method according to any of paragraphs 1 to 21, wherein the selecting, by control circuitry in the source communications node, to handover the communications device from the source communications node to the target communications node at the future time on the basis of the predicted location of the communications device at the future time comprises
  receiving, by receiver circuitry of the source communications node from the communications device, a schedule of a user of the communications device and using, by the control circuitry in the source communications node, the schedule of the user of the communications device to predict the location of the communications device at the future time.

Paragraph 23. A method according to any of paragraphs 1 to 22, wherein the transmitting, by the transmitter circuitry in combination with the control circuitry in the source communications node, the pre-configuration message to the communications device including the configuration for the handover of the communications device from the source communications node to the target communications node comprises
  including, by the control circuitry in the source communications node, the pre-configuration for the handover in a Radio Resource Control (RRC) layer packet;
  transmitting, using the transmitter circuitry in combination with the control circuitry, the RRC layer packet to the communications device Paragraph 24. A method according to paragraph 23, wherein the RRC packet includes one or more of an indication of allocated physical resources to be used by the communications device for establishing a connection to the target communications node during the handover and an identification of a target cell, wherein the target cell is a coverage area of the target communications node.

Paragraph 25. A method according to any of paragraphs 1 to 24, comprising
  transmitting a handover request to the target communications node in response to the selecting, by control circuitry in the source communications node, to handover the communications device from the source communications node to the target communications node at a future time on a basis of a predicted location of the communications device at the future time.

Paragraph 26. A method according to paragraph 25, comprising
  receiving a handover request acknowledgement from the target communications node in response to the transmitting the handover request to the target communications node, the handover request acknowledgement including a confirmation that the target communications node intends to provide physical resources for performing radio communication with the communications device.

Paragraph 27. A method according to any of paragraphs 1 to 25, wherein the communications device is one of a plurality of communications devices, and wherein the selecting, by the control circuitry in the source communications node, to handover the communications device from the source communications node to the target communications node at the future time on a basis of the predicted location of the communications device at the future time comprises
  selecting, by the control circuitry in the source communications node, to handover the plurality of communications devices from the source communications node to the target communications node at the future time on a basis of a predicted location of each of the plurality of communications devices at the future time.

Paragraph 28. A method according to paragraph 27, wherein the transmitting, by the transmitter circuitry in combination with the control circuitry in the source communications node, the pre-configuration message to the communications device including a configuration for the handover of the communications device from the source communications node to the target communications node at the future time comprises
  transmitting, by the transmitter circuitry in combination with the control circuitry in the source communications node, a pre-configuration message to each of the plurality of communications devices including a configuration for the handover of for each of the plurality of communications devices from the source communications node to the target communications node at the future time.

Paragraph 29. A method according to paragraph 28, wherein the arranging, by the transmitter circuitry in combination with the control circuitry in the source communications node, for the communications device to receive the trigger instructing the communications device to handover from the source communications node to the target communications node at the future time comprises
  arranging, by the transmitter circuitry in combination with the control circuitry in the source communications node, for the plurality of communications devices to receive a trigger instructing each of the plurality of communications devices to handover from the source communications node to the target communications node at the future time.

Paragraph 30. A method according to any of paragraphs 1 to 29, wherein the communications device acts a relay between at least one other of the plurality of communications devices and a radio access network in the wireless communications network.

Paragraph 31. A method according to any of paragraphs 1 to 30, wherein the source communications node and the target communications node are infrastructure equipment forming part of a radio access network in the wireless communications network Paragraph 32. A method according to any of paragraphs 1 to 31, wherein the source communications node and the target communications node are relay communications devices which act as a rely between the communications device and a radio access network in the wireless communications network.

Paragraph 33. A method of operating a source communications node of a wireless communications network for controlling handover of one or more communications devices, the method comprising
  transmitting, by the source communications node, a handover pre-configuration message to the one or more communications device providing a configuration for a handover of the one or more communications device from the source communications node to another communications node to form a target communications node when available;
  determining that the target communications node is available to act to receive signals from or to transmit signals to the one or more communications devices via a wireless access interface and to form part of a radio network of the wireless communications network, and
  transmitting by the source communications node, to the one or more communications devices a trigger instructing the one or more communications devices to handover from the source communications node to the target communications node.

Paragraph 34. A method according to paragraph 1, wherein the transmitting, by the transmitter circuitry in combination with the control circuitry in the source communications node, the handover pre-configuration message comprises
  transmitting, by the transmitter circuitry in combination with the control circuitry in the source node at the future time, an indication of a trigger signal, which includes an instruction to the communications device to handover from the source communications node to the target communications node in response to the trigger signal when the target communications node is available.

Paragraph 35. A method according to paragraph 34, comprising
  receiving, by receiver circuitry in combination with the control circuitry in the source communications node, an indication that the target communications node has been deployed, and
  transmitting, by transmitter circuitry in combination with the control circuitry in the source communications node, the trigger signal.

Paragraph 36. A method according to paragraph 35, wherein the transmitting, by transmitter circuitry in combination with the control circuitry in the source communications node, the trigger signal to the communications device including the instruction to the communications device to handover from the source communications node to the target communications node comprises
  receiving, by receiver circuitry in combination with control circuitry in the source communications node, a request for a service from the communications device,
  determining, by the control circuitry in the source communications node, that the service cannot be provided by the source communications node and that the service can be provided by the target communications node, and in response
  transmitting, by the transmitter circuitry in combination with the control circuitry in the source communications node, the trigger signal to the communications device to the communications device.

Paragraph 37. A method according to any of paragraphs 32 to 36, wherein the transmitting, by transmitter circuitry in combination with the control circuitry in the source communications node, the trigger signal to the communications device including the instruction to the communications device to handover from the source communications node to the target communications node comprises
  receiving, by receiver circuitry in combination with control circuitry in the source communications node, a location of the communications device from the communications device;
  receiving, by receiver circuitry in combination with control circuitry in the source communications node, a location of the target communications node from the target communications node;
  determining, by control circuitry in the source communications node, that a distance of the communications device from the target communications node is less than or equal to a pre-defined threshold and, in response,
  transmitting, by the transmitter circuitry in combination with control circuitry in the source communications node, the trigger signal to the communications device.

Paragraph 38. A method according to any of paragraphs 32 to 37, wherein the arranging, by the transmitter circuitry in combination with the control circuitry in the source communications node, for the communications device to receive the trigger instructing the communications device to handover from the source communications node to the target communications node at the future time comprises
  including, by the control circuitry in the source communications node, a position trigger in the pre-configuration message, the position trigger being used by the communications device to trigger the handover from the source communications node to the target communications node if the communications device detects that its location satisfies a pre-defined position condition included in the position trigger.

Paragraph 39. A method according to paragraph 38, wherein the including, by the control circuitry in the source communications node, the position trigger in the pre-configuration message, the position trigger being used by the communications device to trigger the handover from the source communications node to the target communications node if the communications device detects that its location satisfies a pre-defined position condition included in the position trigger comprises
including, in the pre-configuration message, one or more pre-defined radio link quality conditions for at least one of a first radio link between the communications device and the source communications node and a second radio link between the communications device and the target communications node, the one or more pre-defined radio link quality conditions being used by the communications device in combination with the position trigger to trigger the handover from the source node to the target node if the communications device detects that its location satisfies the pre-defined condition included in the position trigger and the communication device detects that the one or more pre-defined radio link quality conditions are satisfied.

Paragraph 40. A method according to any of paragraphs 32 to 39, wherein the transmitting, by the transmitter circuitry in combination with the control circuitry in the source communications node, the pre-configuration message to the communications device including the configuration for the handover of the communications device from the source communications node to the target communications node comprises
including, by the control circuitry in the source communications node, the pre-configuration for the handover in a Radio Resource Control (RRC) layer packet;
transmitting, using the transmitter circuitry in combination with the control circuitry, the RRC layer packet to the communications device Paragraph 41. A method according to any of paragraphs 32 to 40, wherein the communications device is one of a plurality of communications devices, and the method comprises
selecting, by the control circuitry in the source communications node, to handover the plurality of communications devices from the source communications node to the target communications node at the future time on a basis of a predicted location of each of the plurality of communications devices.

Paragraph 42. A method according to paragraph 41, wherein the transmitting, by the transmitter circuitry in combination with the control circuitry in the source communications node, the pre-configuration message to the communications device including a configuration for the handover of the communications device from the source communications node to the target communications node comprises
transmitting, by the transmitter circuitry in combination with the control circuitry in the source communications node, the pre-configuration message to each of the plurality of communications devices including a configuration for the handover of for each of the plurality of communications devices from the source communications node to the target communications node.

Paragraph 43. A method according to paragraph 42, wherein the arranging, by the transmitter circuitry in combination with the control circuitry in the source communications node, for the communications device to receive the trigger instructing the communications device to handover from the source communications node to the target communications node at the future time comprises
arranging, by the transmitter circuitry in combination with the control circuitry in the source communications node, for the plurality of communications devices to receive a trigger instructing each of the plurality of communications devices to handover from the source communications node to the target communications node at the future time.

Paragraph 44. An infrastructure equipment forming part of a radio access network of a wireless communications network, the infrastructure equipment comprising
transceiver circuitry configured to transmit signals to one or more communications devices and to receive signals from the one or more communications devices via a wireless access interface, and
controller circuitry configured to control the transceiver circuitry, wherein the infrastructure equipment is configured to act as a source communications node for at least one of the one or more communications devices and the control circuitry is configured
to select the communications device to handover from the source communications node to a target communications node at a future time on a basis of a predicted location of the communications device at the future time;
to control the transceiver to transmit a pre-configuration message to the communications device including a configuration for the handover of the communications device from the source communications node to the target communications node at the future time; and
to arrange for the communications device to receive a trigger instructing the communications device to handover from the source communications node to the target communications node at the future time.

Paragraph 45. An infrastructure equipment according to paragraph 44, wherein the control circuitry is configured to control the transceiver circuitry to transmit at the future time, a trigger signal to the communications device including an instruction to the communications device to handover from the source communications node to the target communications node in response to the trigger signal.

Paragraph 46. An infrastructure equipment forming part of a radio access network of a wireless communications network, the infrastructure equipment comprising
transceiver circuitry configured to transmit signals to one or more communications devices and to receive signals from the one or more communications devices via a wireless access interface, and
controller circuitry configured to control the transceiver circuitry, wherein the infrastructure equipment is configured to act as a source communications node for at least one of the one or more communications devices and the control circuitry is configured
to control the transmitter to transmit a handover pre-configuration message to the one or more communications device providing a configuration for a handover of the one or more communications device from the source communications node to another communications node to form a target communications node when available;
to determine that the target communications node is available to act to receive signals from or to transmit signals to the one or more communications devices via the wireless access interface and to form part of the radio network of the wireless communications network, and to transmit by the source communications node, to the one or more communications devices a trigger instructing the one or more communications devices to handover from the source communications node to the target communications node.

Paragraph 47. An infrastructure equipment according to paragraph 46, wherein the control circuitry is configured to control the transmitter circuitry to transmit the handover pre-configuration message comprising an indication of a trigger signal, which includes an instruction to the communications device to handover from the source communications node to the target communications node in response to the trigger signal when the target communications node is available.

Paragraph 48. A communications node including transceiver circuitry and control circuitry including a processor for executing computer executable code, and when the computer executable code is executed the processor performs the method according to any of paragraphs 1 to 41.

Paragraph 49. A communications device configured to operate in a wireless communications network, the communications device comprising transceiver circuitry configured to transmit signals to the wireless communications network and to receive signals from the wireless communications network transmitted via a wireless access interface provided by the wireless communications network, and controller circuitry configured to control the transceiver circuitry, wherein the control circuitry is configured to control the transceiver to receive a pre-configuration message from the wireless communications network including a configuration for the handover of the communications device from a source communications node to a target communications node at a future time, the communications device being selected to handover from the source communications node to a target communications node at the future time on a basis of a predicted location of the communications device at the future time; and to receive a trigger instructing the communications device to handover from the source communications node to the target communications node at the future time.

Paragraph 50. A communications device configured to operate in a wireless communications network, the communications device comprising transceiver circuitry configured to transmit signals to the wireless communications network and to receive signals from the wireless communications network transmitted via a wireless access interface provided by the wireless communications network, and controller circuitry configured to control the transceiver circuitry, wherein the control circuitry is configured to control the transceiver circuitry to receive a handover pre-configuration message from the wireless communications network providing a configuration for a handover of the communications device from a source communications node to another communications node, which is to form a target communications node when available for the communications device, and to receive from the source communications node a trigger instructing the communications device to handover from the source communications node to the target communications node, the source communications node determining that the target communications node is available to act to receive signals from or to transmit signals to the communications device via the wireless access interface forming part of the radio network of the wireless communications network.

REFERENCES

[1] RP-182090, "Revised SID: Study on NR Industrial Internet of Things (IoT)," 3GPP RAN #81.

[2] Holma H. and ToFskala A, "LTE for UMTS OFDMA and SC-FDMA based radio access", John Wiley and Sons, 2009.

[3] 3GPP TS 38.321, "Medium Access Control (MAC) protocol specification (Rel-15)", v15.3.0.

[4] 3GPP document RP-182894, "WID: 2-step RACH for NR," RAN #82.

[5] 3GPP document RP-182878, "NR-based Access to Unlicensed Spectrum", RAN #82.

Annex

Figure 13:
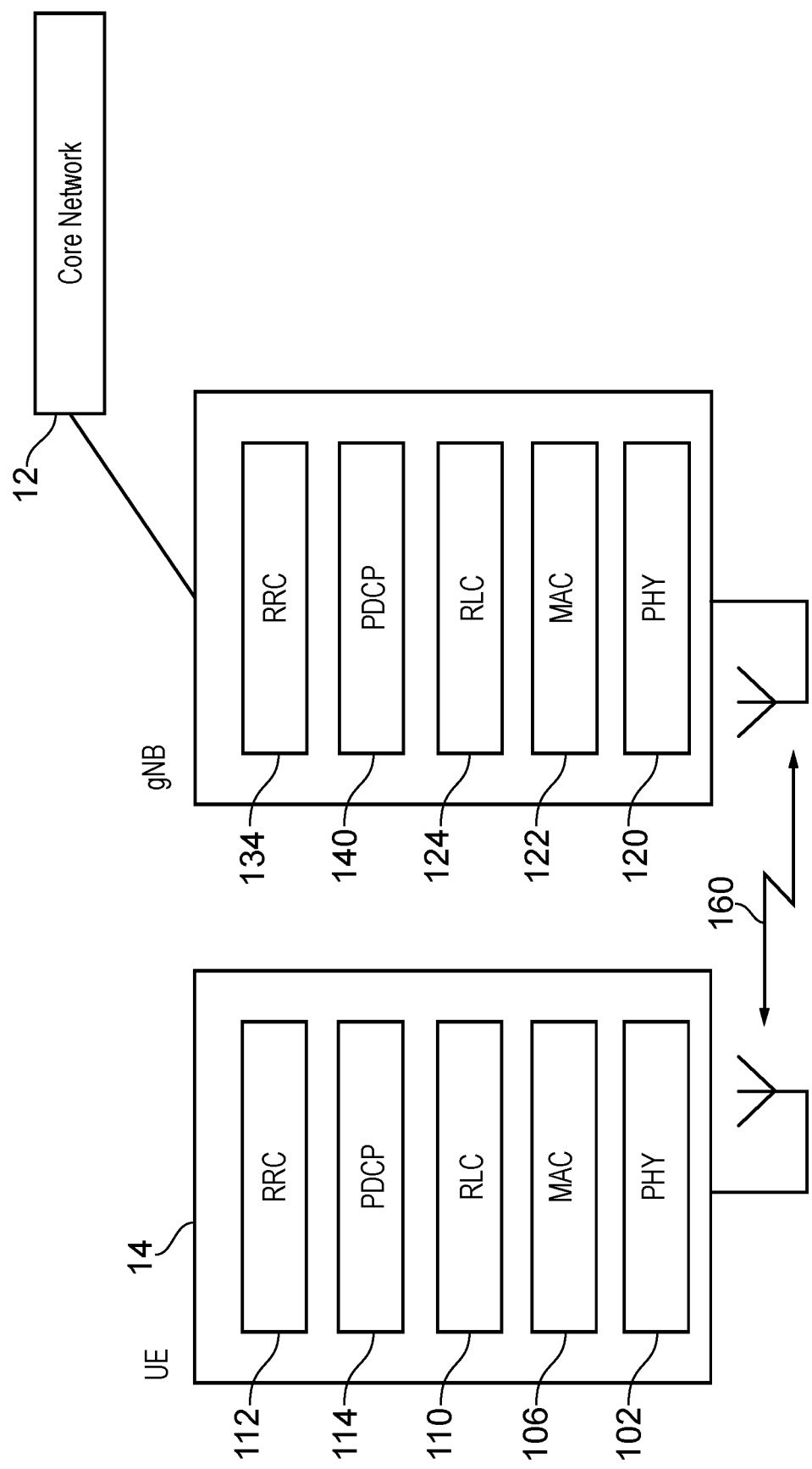
FIG. 13 is a block diagram showing logical protocol entities in a control plane protocol stack within a UE and source node which may be configured to operate in accordance with example embodiments of the present technique.

FIG. 13 is a block diagram showing logical protocol entities in a control plane protocol stack within a communications device 14 and a gNB 11 (an example of a source or target communications node) which may be configured to operate in accordance with example embodiments of the present technique.

Protocol entities may be characterised by functions which they provide to other protocol entities. For example, a physical layer (PHY) protocol entity 102 may control the transmitter 96 and receiver 92 to transmit and receive signals representing data on the wireless access interface. The PHY protocol entity 102 may thus provide an encoding and modulation function for data transmission, and a demodulation and decoding function for data reception. The PHY protocol entity 102 may provide these services to a medium access control (MAC) protocol entity 106 which in turn provides services to a radio link control (RLC) protocol entity 110. The RLC entity 110 interacts with a packet data convergence protocol (PDCP) entity 114, which in turn receives data for transmission from, and passes received data to, a Radio Resource Control (RRC) layer 112. The protocol stack may additionally protocol entities (not shown) as will be appreciated by a person skilled in the art. For example, the protocol stack may include an NAS layer which is an example of an 'upper layer', with respect to the access stratum (AS) layer comprising the PDCP protocol entity 114 and lower layer protocol entities. Data may be communicated between the communications device 14 and the gNB 11 via a wireless access interface 160.

The gNB 11 has an RLC entity 124 which has as a peer the RLC entity 110 of the communications device 14 for each radio bearer. The gNB 11 has a MAC protocol entity 122 being the peer of the corresponding MAC entity 106 of the communications device 14, and a PHY entity 120 being a peer of the corresponding PHY entity 102 of the communications device 14. At the PDCP protocol layer, the PDCP entity 114 of the communications device 14 has as its peer a PDCP entity 140 of the gNB 11. Similarly an RRC entity 134 of the gNB 11 is the peer of the communications device's RRC entity 112.

Each protocol entity in the communications device 14 may be implemented by the controller 90 in combination with the receiver 92 and transmitter 70 of the communications device. Similarly, each protocol entity in the gNB 11 may be implemented by the controller 80 in combination with the receiver 82 and transmitter 86 of the infrastructure equipment.

What is claimed is:

1. A method of operating a source communications node of a wireless communications network for controlling handover of a communications device from the source communications node to a target communications node of the wireless communications network, the method comprising:

selecting, by control circuitry in the source communications node, to handover the communications device from the source communications node to the target communications node at a future time on a basis of a predicted location of the communications device at the future time;

receiving, by receiver circuitry in combination with control circuitry in the source communications node, a request for a service from the communications device, determining, by the control circuitry in the source communications node, that a service cannot be provided by the source communications node and that the service can be provided by the target communications node;

transmitting, by transmitter circuitry in combination with the control circuitry in the source communications node, a pre-configuration message to the communications device including a configuration for the handover of the communications device from the source communications node to the target communications node at the future time; and transmitting, by the transmitter circuitry in combination with the control circuitry in the source communications node, a trigger signal to the communication device including an instruction to the communications device to handover from the source communications node to the target communications node at the future time in response to determining that the service cannot be provided by the source communications node and that the service can be provided by the target communications node.

2. The method according to claim 1, wherein the trigger signal is a physical layer signal.

3. The method according to claim 1, wherein the trigger signal is included in Downlink Control Information (DCI) addressed to the communications device using either a Group Radio Network Temporary Identifier (Group-RNTI) or Cell Radio Network Temporary Identifier (C-RNTI).

4. The method according to claim 1, wherein the trigger signal is included in system information transmitted to the communications device.

5. The method according to claim 1, wherein the trigger signal is included in a paging message transmitted to the communications device.

6. The method according to claim 1, wherein the transmitting, by the transmitter circuitry in combination with the control circuitry in the source communications node at the future time, the trigger signal to the communications device including the instruction to the communications device to handover from the source communications node to the target communications node comprises:

determining, by the control circuitry in the source communications node, that a load on the source node has exceeded a predetermined threshold, and in response transmitting, by the transmitter circuitry combination with the control circuitry in the source communications node, the trigger signal to the communications device.

7. The method according to claim 6, wherein the determining, by the control circuitry in the source communications node that the load on the source communications node has exceeded a pre-determined threshold comprises:

receiving, by receiver circuitry in combination with the control circuitry in the source communications node, an indication that the load on the source node has exceeded the predetermined threshold, and determining that the load on the source communications node has exceeded the predetermined threshold based on the received indication.

8. The method according to claim 6, wherein the determining, by the control circuitry in the source communications node that the load on the source communications node has exceeded a pre-determined threshold comprises;

measuring, by the control circuitry in the source communications node, that the load on the source node has exceeded the predetermined threshold, and determining that the load on the source communications node has exceeded the predetermined threshold based on the measurement.

9. The method according to claim 1, wherein the determining, by the control circuitry in the source communications node, that the service cannot be provided by the source node and that the service can be provided by the target node comprises:

receiving, by receiver circuitry in combination with the control circuitry in the source communications node, an indication that the service cannot be provided by the source communications node and that the service can be provided by the target node and determining that the service cannot be provided by the source communications node and that the service can be provided by the target communications node based on the received indication.

10. The method according to claim 1, wherein the determining, by the control circuitry in the source communications node, that the service cannot be provided by the source node and that the service can be provided by the target node comprises:

detecting, by the control circuitry in the source communications node, that the service cannot be provided by the source communications node and that the service can be provided by the target node and determining that the service cannot be provided by the source communications node and that the service can be provided by the target communications node based on the detection.

11. The method according to claim 1, wherein the transmitting, by transmitter circuitry in combination with the control circuitry in the source communications node, the trigger signal to the communications device including the instruction to the communications device to handover from the source communications node to the target communications node comprises:

receiving, by receiver circuitry in combination with control circuitry in the source communications node, a location of the communications device from the communications device;

receiving, by receiver circuitry in combination with control circuitry in the source communications node, a location of the target communications node from the target communications node;

determining, by control circuitry in the source communications node, that a distance of the communications device from the target communications node is less than or equal to a pre-defined threshold and, in response, transmitting, by the transmitter circuitry in combination with control circuitry in the source communications node, the trigger signal to the communications device.

12. The method according to claim 1, wherein the transmitting, by the transmitter circuitry in combination with the control circuitry in the source communications node, of the trigger signal to the communications device including the instruction to the communications device to handover from the source communications node to the target communications node at the future time comprises:

including, by the control circuitry in the source communications node, a position trigger in the pre-configuration message, the position trigger being used by the communications device to trigger the handover from the source communications node to the target communications node if the communications device detects that its location satisfies a pre-defined position condition included in the position trigger.

13. The method according to claim 12, wherein the including, by the control circuitry in the source communications node, the position trigger in the pre-configuration message, the position trigger being used by the communications device to trigger the handover from the source communications node to the target communications node if the communications device detects that its location satisfies a pre-defined position condition included in the position trigger comprises:

including, in the pre-configuration message, one or more pre-defined radio link quality conditions for at least one of a first radio link between the communications device and the source communications node and a second radio link between the communications device and the target communications node, the one or more pre-defined radio link quality conditions being used by the communications device in combination with the position trigger to trigger the handover from the source node to the target node if the communications device detects that its location satisfies the pre-defined condition included in the position trigger and the communication device detects that the one or more pre-defined radio link quality conditions are satisfied.

14. The method according to claim 1, wherein the selecting, by the control circuitry in the source communications node, to handover the communications device from the source communications node to the target communications node at the future time on the basis of the predicted location of the communications device at the future time comprises:

receiving, by receiver circuitry combination with control circuitry in the source communications node from the communications device, a location of the communications device over a measuring time period and using, by the control circuitry in the source communications node, the location of the communications device over the measuring time period to predict the location of the communications device at the future time.

15. The method according to claim 1, wherein the selecting, by control circuitry in the source communications node, to handover the communications device from the source communications node to the target communications node at the future time on the basis of the predicted location of the communications device at the future time comprises:

receiving, by receiver circuitry of the source communications node from the communications device, a schedule of a user of the communications device and using, by the control circuitry in the source communications node, the schedule of the user of the communications device to predict the location of the communications device at the future time.

16. The method according to claim 1, wherein the transmitting, by the transmitter circuitry in combination with the control circuitry in the source communications node, the pre-configuration message to the communications device including the configuration for the handover of the communications device from the source communications node to the target communications node comprises:

including, by the control circuitry in the source communications node, the pre-configuration for the handover in a Radio Resource Control (RRC) layer packet; and transmitting, using the transmitter circuitry in combination with the control circuitry, the RRC layer packet to the communications device.

17. A communications device configured to operate in a wireless communications network, the communications device comprising transceiver circuitry configured to transmit signals to the wireless communications network and to receive signals from the wireless communications network transmitted via a wireless access interface provided by the wireless communications network, and controller circuitry configured to control the transceiver circuitry, wherein the control circuitry is configured to control the transceiver to receive a pre-configuration message from the wireless communications network including a configuration for the handover of the communications device from a source communications node to a target communications node at a future time, the communications device being selected to handover from the source communications node to a target communications node at the future time on a basis of a predicted location of the communications device at the future time;

control the transceiver circuitry to transmit a request for a service to the source communications node, wherein the source communications node determines that the service cannot be provided by the source communications node and that the service can be provided by the target communications node; and control the transceiver circuitry to receive a trigger including an instruction to the communications device to handover from the source communications node to the target communications node at the future time in response to determining that the service cannot be provided by the source communications node and that the service can be provided by the target communications node.

18. A communications device configured to operate in a wireless communications network, the communications device comprising transceiver circuitry configured to transmit signals to the wireless communications network and to receive signals from the wireless communications network transmitted via a wireless access interface provided by the wireless communications network, and controller circuitry configured to control the transceiver circuitry, wherein the control circuitry is configured to control the transceiver circuitry to receive a handover pre-configuration message from the wireless communications network providing a configuration for a handover of the communications device from a source communications node to another communications node, which is to form a target communications node when available for the communications device, the communications device being selected to handover from the source communications node to the target communications node at a future time on a basis of a predicted location of the communications device at the future time;

control the transceiver circuitry to transmit a request for a service to the source communications node; and control the transceiver circuitry to receive from the source communications node a trigger signal including an instruction to the communications device to handover from the source communications node to the target communications node, the source communications node determining that the target communications node is available to act to receive signals from or to transmit signals to the communications device via the wireless access interface forming part of the radio network of the wireless communications network and determining that the service cannot be provided by the source communications node and that the service can be provided by the target communications node, wherein the trigger signal is transmitted in response to the determining.

* * * * *